(12) United States Patent
Lee et al.

(10) Patent No.: US 12,724,231 B2
(45) Date of Patent: Sep. 1, 2026

(54) IMAGING LENS SYSTEM

(71) Applicant: SAMSUNG ELECTRO-MECHANICS CO., LTD., Suwon-si (KR)

(72) Inventors: Da Ye Lee, Suwon-si (KR); Hyuk Joo Kim, Suwon-si (KR); Kyu Min Chae, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 307 days.

(21) Appl. No.: 18/355,916

(22) Filed: Jul. 20, 2023

(65) Prior Publication Data

US 2024/0118518 A1 Apr. 11, 2024

(30) Foreign Application Priority Data

Sep. 30, 2022 (KR) ........................ 10-2022-0125164
Nov. 23, 2022 (KR) ........................ 10-2022-0157883

(51) Int. Cl.
*G02B 9/64* (2006.01)
*G02B 13/18* (2006.01)

(52) U.S. Cl.
CPC ............... *G02B 9/64* (2013.01); *G02B 13/18* (2013.01)

(58) Field of Classification Search
CPC ....... G02B 9/64; G02B 13/0045; G02B 13/18
USPC .......................................................... 359/754
See application file for complete search history.

(56) References Cited

U.S. PATENT DOCUMENTS 8,908,292 B2 * 12/2014 Chou ..................... G02B 13/18 359/717
2010/0079874 A1 4/2010 Kamei
2014/0354857 A1 * 12/2014 Kato .............. G02B 15/145121 359/557
2016/0109687 A1 4/2016 Son
(Continued)

FOREIGN PATENT DOCUMENTS

CN 113467046 A 10/2021
JP 2018-136476 A 8/2018
(Continued)

OTHER PUBLICATIONS

Herbert Gross, Handbook of Optical Systems, 2007, Wiley-VCH, vol. 3, pp. 377-379 (Year: 2007).*
(Continued)

*Primary Examiner* — Zachary W Wilkes
*Assistant Examiner* — Elizabeth M Hall
(74) *Attorney, Agent, or Firm* — NSIP Law

(57) ABSTRACT

An imaging lens system includes a first lens having negative refractive power, a second lens having refractive power, a third lens having refractive power, a fourth lens having positive refractive power, a fifth lens having a concave object-side surface, a sixth lens having a convex object-side surface, a seventh lens having refractive power, and an eighth lens having refractive power, wherein the first to eighth lenses are sequentially disposed at intervals from the object-side surface, wherein the imaging lens system satisfies the following conditional expression: 0.170<ImgHT/TTL<0.182 where ImgHT is a height of an imaging plane and TTL is a distance from an object-side surface of the first lens to the imaging plane.

20 Claims, 20 Drawing Sheets

(56) References Cited

U.S. PATENT DOCUMENTS

| | | | | |
|---|---|---|---|---|
| 2017/0192200 | A1 | 7/2017 | Hsieh et al. | |
| 2019/0154986 | A1 | 5/2019 | Hagiwara | |
| 2020/0012078 | A1* | 1/2020 | Kuo | G02B 13/18 |
| 2020/0073216 | A1* | 3/2020 | Wu | G02B 13/04 |
| 2020/0150386 | A1 | 5/2020 | Wei et al. | |
| 2020/0209543 | A1 | 7/2020 | Kim et al. | |
| 2020/0218038 | A1* | 7/2020 | Cheng | G02B 13/04 |
| 2020/0400922 | A1* | 12/2020 | Hirano | H04N 23/55 |
| 2021/0080693 | A1* | 3/2021 | Asami | G02B 13/04 |
| 2022/0113514 | A1* | 4/2022 | Shi | G02B 13/04 |
| 2022/0236541 | A1* | 7/2022 | Kurokawa | B60W 30/0956 |

FOREIGN PATENT DOCUMENTS

| | | | |
|---|---|---|---|
| JP | 2019-211637 | A | 12/2019 |
| KR | 10-2020-0084181 | A | 7/2020 |

OTHER PUBLICATIONS

Gross, Herbert, et al. "Handbook of Optical Systems, vol. 3: Aberration Theory and Correction of Optical Systems" XP055258161, 2007, (5 pages).

Extended European search report issued on Feb. 20, 2024, in counterpart European Patent Application No. 23186350.7 (13 pages).

Korean Office Action issued on Dec. 5, 2024 in corresponding Korean Patent Application No. 10-2022-0157883. (7pages in English, 5pages in Korean).

Korean Office Action Issued on Aug. 27, 2025, in Counterpart Korean Patent Application No. 10-2022-0157883 (4 Pages in English, 4 Pages in Korean).

* cited by examiner

IMAGING LENS SYSTEM

CROSS-REFERENCE TO RELATED APPLICATIONS

This application claims the benefit under 35 USC 119(a) of Korean Patent Application Nos. 10-2022-0125164 filed on Sep. 30, 2022, and 10-2022-0157883 filed on Nov. 23, 2022, in the Korean Intellectual Property Office, the entire disclosures of which are incorporated herein by reference for all purposes.

BACKGROUND

1. Field

The present disclosure relates to an imaging lens system that may be used in a wide temperature range.

2. Description of Background

Vehicles may include cameras to minimize personal and property damage caused due to traffic accidents. For example, one or more cameras may be installed on front and rear bumpers of a vehicle to provide information regarding objects located to the front and rear of the vehicle to the driver. As described above, because vehicle cameras are disposed on the bumpers of the vehicle, the vehicle cameras may be affected by the external environment. For example, a high-temperature environment in summer and a low-temperature environment in winter may significantly degrade the performance and resolution of vehicle cameras. In addition, strong ultraviolet rays incident through a lens of a vehicle camera may change optical performance or physical characteristics of some lenses (e.g., lenses formed of plastic). Accordingly, there is a need to develop a camera capable of minimizing performance deterioration caused by the external environment and ultraviolet rays and an imaging lens system suitable for the camera.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens having negative refractive power, a second lens having refractive power, a third lens having refractive power, a fourth lens having positive refractive power, a fifth lens having a concave object-side surface, a sixth lens having a convex object-side surface, a seventh lens having refractive power, and an eighth lens having refractive power, wherein the first to eighth lenses are sequentially arranged from an object side, wherein the imaging lens system satisfies the following conditional expression: $0.170<ImgHT/TTL<0.182$ where ImgHT is a height of an imaging plane and TTL is a distance from an object-side surface of the first lens to the imaging plane.

The imaging lens system may satisfy the following conditional expression: $0.70<f/f4<0.90$ where f is a focal length of the imaging lens system and f4 is a focal length of the fourth lens.

The imaging lens system may satisfy the following conditional expression: $L1D1/TTL<0.350$ where L1D1 is an effective diameter of an object-side surface of the first lens.

The imaging lens system may satisfy the following conditional expression: $f1/f2<0$ where f1 is a focal length of the first lens and f2 is a focal length of the second lens.

The imaging lens system may satisfy the following conditional expression: $f5/f6<0$ where f5 is a focal length of the fifth lens and f6 is a focal length of the sixth lens.

The imaging lens system may satisfy the following conditional expression: $4.50<TTL/f<4.90$ where f is a focal length of the imaging lens system.

The imaging lens system may satisfy the following conditional expression: $L1D1/ImgHT<2.0$ where L1D1 is an effective diameter of an object-side surface of the first lens.

f number may be less than 1.7.

In another general aspect, an imaging lens system includes a first lens, a second lens, a third lens, a fourth lens, a fifth lens, a sixth lens, a seventh lens, and an eighth lens sequentially disposed at intervals from an object side, wherein the first lens and the fifth lens each have negative refractive power, the sixth lens has a convex object-side surface, and wherein the imaging lens system satisfies the following conditional expression: $15.0<V3/(Nd1+Nd4)<17.0$ where Nd1 is a refractive index of the first lens, Nd4 is a refractive index of the fourth lens, and V3 is an Abbe number of the third lens.

The imaging lens system may satisfy the following conditional expression: $1.60<L1D1/ImgHT<2.0$ where L1D1 is an effective diameter of an object-side surface of the first lens and ImgHT is a height of an imaging plane.

The imaging lens system may satisfy the following conditional expression: $0.009<|f/R1|<0.090$ where f is a focal length of the imaging lens system and R1 is a radius of curvature of an object-side surface of the first lens.

The imaging lens system may satisfy the following conditional expression: $0.002<|R2/R1|<0.080$ where R1 is a radius of curvature of an object-side surface of the first lens and R2 is a radius of curvature of an image-side surface of the first lens.

The imaging lens system may satisfy the following conditional expression: $0.80<|R5/R6|<1.40$ where R5 is a radius of curvature of an object-side surface of the third lens and R6 is a radius of curvature of an image-side surface of the third lens.

The imaging lens system may satisfy the following conditional expression: $12<V4/(Nd1+Nd4)<15$ where V4 is an Abbe number of the fourth lens.

The imaging lens system may satisfy the following conditional expression: $2.3<(Nd1+Nd4)/Ndmin$ where Ndmin is a minimum value among refractive indices of the first to eighth lenses.

The imaging lens system may satisfy the following conditional expression: $59<V1/Nd2+V4/Nd5<62$ where V1 is an Abbe number of the first lens, V4 is an Abbe number of the fourth lens, Nd2 is a refractive index of the second lens, and Nd5 is a refractive index of the fifth lens.

In another general aspect, an imaging lens system includes a first lens having negative refractive power and an index of refraction greater than 1.74 and less than 1.90, a second lens having positive refractive power, a third lens having positive refractive power, a fourth lens having positive refractive power and an index of refraction greater than 1.70 and less than 1.84, a fifth lens having negative refractive power, a sixth lens having a positive refractive power, a seventh lens having negative refractive power, and an eighth lens having positive refractive power, wherein the first to eighth lenses are sequentially disposed at intervals from the object-side surface.

The first lens may have a concave image-side surface, and the second lens may have a convex image-side surface.

The third lens may have a concave object-side surface, the fourth lens may have a convex object-side surface, the fifth lens may have a concave object-side surface, and the sixth lens may have a convex object-side surface.

The seventh lens may have a concave image-side surface, and the eighth lens may have a convex object-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
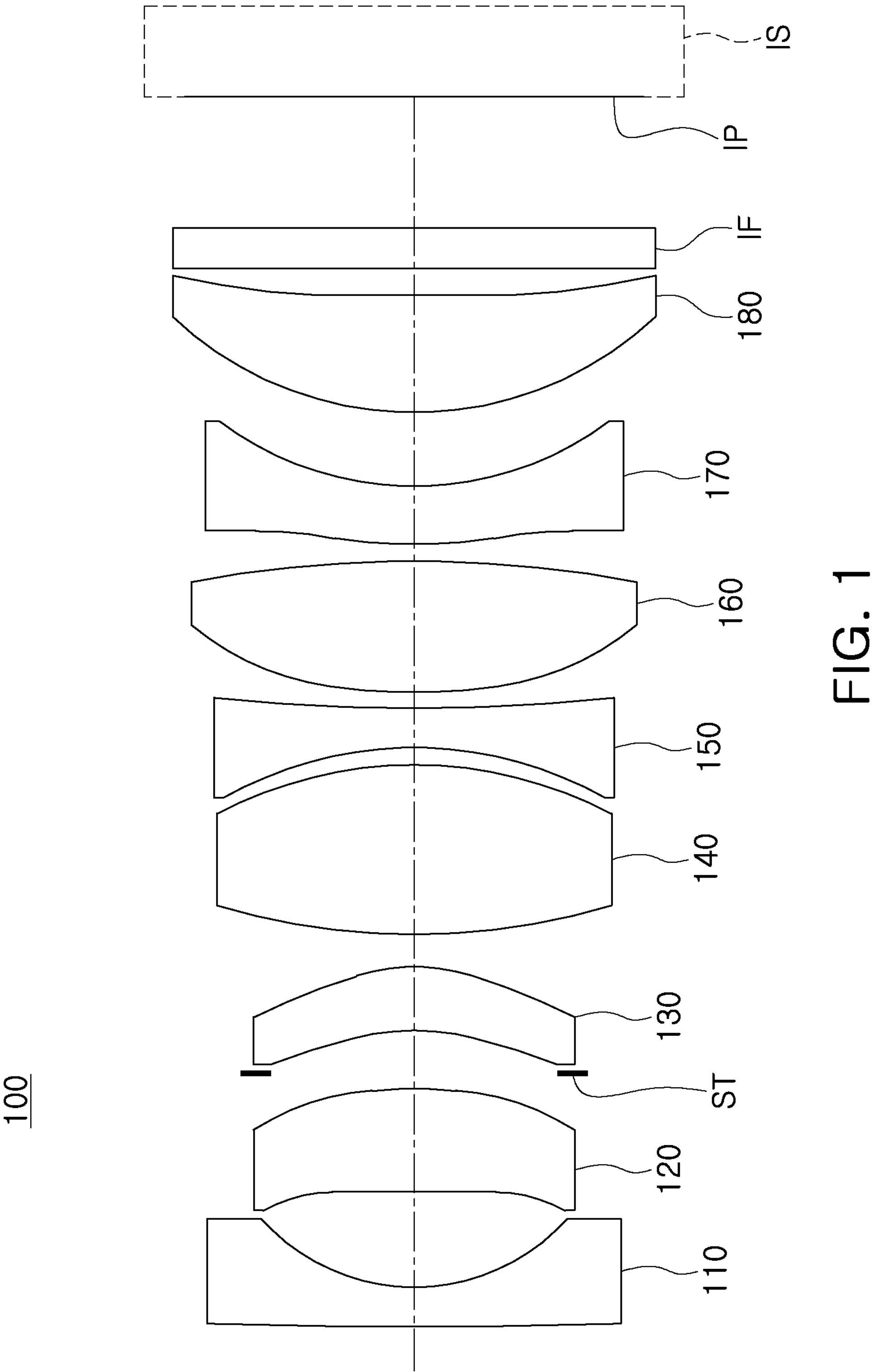
FIG. 1 is a configuration diagram of an imaging lens system according to a first example embodiment.

Hereinafter, while example embodiments of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In describing the present disclosure below, terms referring to the components of the present disclosure are named in consideration of the function of each component, and thus should not be construed as limiting the technical components of the present disclosure.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

Example embodiments provide an imaging lens system capable of minimizing deterioration of a lens caused by ultraviolet rays, while having a wide operating temperature range.

In the examples, a first lens refers to a lens most adjacent to an object (or a subject), and an eighth lens refers to a lens most adjacent to an imaging plane (or an image sensor). In the examples, a unit of a radius of curvature, a thickness, a TTL (a distance from an object-side surface of the first lens to an imaging plane), an ImgHT (a height of an imaging plane), and a unit of an effective radius is indicated in millimeters (mm).

A thickness of a lens, a distance between lenses, and a TTL refer to a distance of a lens along an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

The imaging optics described herein may be configured to be mounted on a transport device. For example, the imaging lens system may be mounted in a surveillance camera or a camera for autonomous driving mounted on cars, trucks, fire engines, forklifts, or the like. However, the use range and use examples of the imaging lens system described in this specification are not limited to the aforementioned devices. For example, the imaging lens system may be mounted on a camera provided in a surveillance drone, a transport drone, or the like.

An imaging lens system according to a first aspect of the present disclosure may include a plurality of lenses. For example, the imaging lens system may include a first lens, a second lens, a third lens, a fourth lens, a fifth lens, a sixth lens, a seventh lens, and an eighth lens sequentially disposed from an object side. The imaging lens system according to the first aspect may be configured such that an entrance pupil is formed on an object side of the third lens. For example, the entrance pupil may be formed between the first lens and the second lens. As another example, the entrance pupil may be formed at a point within 3.0 mm from an object-side surface of the first lens. As another example, the entrance pupil may be formed on the object side of a stop.

The imaging lens system according to the first aspect may further include other optical elements as needed. For example, the imaging lens system according to the first aspect may further include a stop. The stop may be disposed between the lenses. For example, the stop may be disposed between the second lens and the third lens. As another example, the stop may be disposed between lenses having refractive power of the same sign.

An imaging lens system according to a second aspect of the present disclosure may include a plurality of lenses. For example, the imaging lens system may include a first lens, a second lens, a third lens, a fourth lens, a fifth lens, a sixth lens, a seventh lens, and an eighth lens sequentially disposed from the object side. An imaging lens system according to the second aspect of the present disclosure may include one or more of a glass lens and a plastic lens. For example, the imaging lens system according to the second aspect may include two glass lenses and six plastic lenses. However, the number of glass lenses and plastic lenses constituting the imaging lens system is not limited to the aforementioned form. For example, the imaging lens system according to the second aspect may include one glass lens and seven plastic lenses.

In the imaging lens system according to the second aspect, the lens formed of a glass material may reduce or suppress deterioration of a plastic material. For example, in the imaging lens system according to the second aspect, the first lens disposed at the forefront may be formed of a glass material. As another example, in the imaging lens system according to the second aspect, one of the lenses disposed behind the stop (image side) may be formed of a glass material. As a specific example, the fourth lens may be formed of a glass material.

An imaging lens system according to a third aspect of the present disclosure may include a plurality of lenses. For example, the imaging lens system may include a first lens, a second lens, a third lens, a fourth lens, a fifth lens, a sixth lens, a seventh lens, and an eighth lens sequentially disposed from the object side. The imaging lens system according to the third aspect of the present disclosure may include a lens configured to block ultraviolet rays. For example, in the imaging lens system according to the third aspect, the first lens disposed at the forefront may be configured to block ultraviolet rays. The imaging lens system according to the third aspect may include a plastic lens. For example, lenses disposed behind the first lens may be lenses formed of a plastic material.

An imaging lens system according to a fourth aspect of the present disclosure may include a plurality of lenses. For example, the imaging lens system may include a first lens, a second lens, a third lens, a fourth lens, a fifth lens, a sixth lens, a seventh lens, and an eighth lens sequentially disposed from the object side. The imaging lens system according to the fourth aspect of the present disclosure may include a lens having positive refractive power and a lens having negative refractive power. For example, in the imaging lens system according to the fourth aspect, the first lens may have negative refractive power, but the fourth lens may have positive refractive power. The imaging lens system according to the fourth aspect may include a lens having a concave object-side surface. For example, in the imaging lens system according to the fourth aspect, the fifth lens may have a concave object-side surface. The imaging lens system according to the fourth aspect may include a lens having a convex object-side surface. For example, in the imaging lens system according to the fourth aspect, the sixth lens may have a convex object-side surface. The imaging lens system according to the fourth aspect may satisfy a specific conditional expression. For example, the imaging lens system according to the fourth aspect may satisfy a conditional expression of 0.17<ImgHT/TTL<0.182 regarding ImgHT (a height of an imaging plane) and TTL (a distance from the object-side surface of the first lens to the imaging plane).

An imaging lens system according to a fifth aspect of the present disclosure may include a plurality of lenses. For example, the imaging lens system may include a first lens, a second lens, a third lens, a fourth lens, a fifth lens, a sixth lens, a seventh lens, and an eighth lens sequentially disposed from the object side. The imaging lens system according to the fifth aspect of the present disclosure may include a lens having negative refractive power. For example, in the imaging lens system according to the fifth aspect, each of the first lens and the fifth lens may have negative refractive power. The imaging lens system according to the fifth aspect may include a lens having a convex object-side surface. For example, in the imaging lens system according to the fifth aspect, the sixth lens may have a convex object-side surface. The imaging lens system according to the fifth aspect may satisfy a unique conditional expression. For example, the imaging lens system according to the fifth aspect may satisfy a conditional expression of 15<V3/(Nd1+Nd4)<17) regarding an Abbe number V3 of the third lens, a refractive index Nd1 of the first lens, and a refractive index Nd4 of the fourth lens.

An imaging lens system according to a sixth aspect of the present disclosure may include a plurality of lenses. For example, the imaging lens system may include a first lens, a second lens, a third lens, a fourth lens, a fifth lens, a sixth lens, a seventh lens, and an eighth lens sequentially disposed from the object side. The imaging lens system according to the sixth aspect may be configured to satisfy at least one of the following conditional expressions.

$$0.70<f/f4<0.90$$

$$D1/TTL<0.35$$

$$0.170<ImgHT/TTL<0.182$$

$$f1/f2<0$$

$$f5/f6<0$$

$$4.50<TTL/f<4.90$$

$$D1/ImgHT<2.0$$

In the above conditional expressions, f is a focal length of the imaging lens system, f1 is a focal length of the first lens, f2 is a focal length of the second lens, f4 is a focal length of the fourth lens, f5 is a focal length of the fifth lens, f6 is a focal length of the sixth lens, L1D1 is an effective diameter of the object-side surface of the first lens, TTL is a distance from the object-side surface of the first lens to the imaging plane, and ImgHT is the height of the imaging plane.

The imaging lens system according to the sixth aspect of the present disclosure may satisfy a more limited numerical range for some conditional expressions as follows.

$$0.25L1D1/TTL<0.35$$

$$-0.40<f1/f2<-0.20$$

$$-1.0<f5/f6<-0.40$$

$$1.60<L1D1/ImgHT<2.0$$

An imaging lens system according to a seventh aspect of the present disclosure may include a plurality of lenses. For example, the imaging lens system may include a first lens, a second lens, a third lens, a fourth lens, a fifth lens, a sixth lens, a seventh lens, and an eighth lens sequentially disposed from the object side. The imaging lens system according to the seventh aspect may be configured to satisfy at least one of the following conditional expressions.

$$f\ \text{number}<1.7$$

$$-1.20<f1/f<-0.90$$

$$-0.40<f1/f3<-0.020$$

$$-1.0<f1/f4<-0.60$$

$$-10<V1-V3<-5$$

$$0.009<|f/R1|<0.0090$$

$$0.002<|R2/R1|<0.080$$

$$0.80<|R5/R6|<1.40$$

$$12<V4/(Nd1+Nd4)<15$$

$$15<V3/(Nd1+Nd4)<17$$

$$2.30<(Nd1+Nd4)/Nd\ \text{min}<2.40$$

$$59<V1/Nd2+V4/Nd5<62$$

In the above conditional expressions, f3 is a focal length of the third lens, f4 is a focal length of the fourth lens, R1 is a radius of curvature of an object-side surface of the first lens, R2 is a radius of curvature of an image-side surface of the first lens, R5 is a radius of curvature of an object-side surface of the third lens, R6 is a radius of curvature of an image-side surface of the third lens, V1 is an Abbe number of the first lens, V3 is an Abbe number of the third lens, V4 is an Abbe number of the fourth lens, Nd1 is a refractive index of the first lens, Nd2 is a refractive index of the second lens, Nd4 is a refractive index of the fourth lens, Nd5 is a refractive index of the fifth lens, and Ndmin is the minimum value of the refractive indices of the first lens to eighth lens.

An imaging lens system according to the present specification may include one or more lenses having the following characteristics as needed. For example, the imaging lens system according to the first aspect may include one of the first to eighth lenses according to the following characteristics. As another example, one of the imaging lens systems according to the second to seventh aspects may include one or more of the first to eighth lenses according to the following characteristics. However, the imaging lens systems according to the aspects described above do not necessarily include the lenses according to the following characteristics. Hereinafter, the characteristics of the first to eighth lenses will be described.

The first lens has refractive power. For example, the first lens may have negative refractive power. One surface of the first lens may be concave. For example, an image-side surface of the first lens may be concave. The first lens includes a spherical surface. For example, both surfaces of the first lens may be spherical. The first lens may be formed of a material having high light transmittance and excellent workability. For example, the first lens may be formed of a glass material. The first lens may be configured to have a predetermined refractive index. For example, the refractive index of the first lens may be greater than 1.7. As a specific example, the refractive index of the first lens may be greater than 1.74 and less than 1.90. The first lens may have a predetermined Abbe number. For example, the Abbe number of the first lens may be 40 or more. As a specific example, the Abbe number of the first lens may be greater than 45 and less than 60. The first lens may be configured to block light of a specific wavelength. For example, the first lens may be configured to block ultraviolet rays.

The second lens has refractive power. For example, the second lens may have positive refractive power. One surface of the second lens may be convex. For example, an image-side surface of the second lens may be convex. The second lens includes an aspherical surface. For example, both surfaces of the second lens may be aspherical. The second lens may be formed of a material having high light transmittance and excellent workability. For example, the second lens may be formed of a plastic material. The second lens may be configured to have a predetermined refractive index. For example, the refractive index of the second lens may be greater than 1.6. As a specific example, the refractive index of the second lens may be greater than 1.60 and less than 1.64. The second lens may have a predetermined Abbe number. For example, the Abbe number of the second lens may be less than 30. As a specific example, the Abbe number of the second lens may be greater than 20 and less than 30.

The third lens has refractive power. For example, the third lens may have positive refractive power. One surface of the third lens may be concave. For example, an object-side surface of the third lens may be concave. The third lens includes an aspherical surface. For example, both surfaces of the third lens may be aspherical. The third lens may be formed of a material having high light transmittance and excellent workability. For example, the third lens may be formed of a plastic material. The third lens may be configured to have a predetermined refractive index. For example, the refractive index of the third lens may be greater than 1.5 and less than 1.6. The third lens may have a predetermined Abbe number. For example, the Abbe number of the third lens may be greater than 50 and less than 60.

The fourth lens has refractive power. For example, the fourth lens may have positive refractive power. One surface of the fourth lens may be convex. For example, an object-side surface of the fourth lens may be convex. The fourth lens includes an aspherical surface. For example, both surfaces of the fourth lens may be aspherical. The fourth lens may be formed of a material having high light transmittance and excellent workability. For example, the fourth lens may be formed of a glass material. The fourth lens may be configured to have a predetermined refractive index. For example, the refractive index of the fourth lens may be greater than 1.70 and less than 1.84. The fourth lens may have a predetermined Abbe number. For example, the Abbe number of the fourth lens may be greater than 50 and less than 70.

The fifth lens has refractive power. For example, the fifth lens may have negative refractive power. One surface of the fifth lens may be concave. For example, an object-side surface of the fifth lens may be concave. The fifth lens includes an aspherical surface. For example, both surfaces of the fifth lens may be aspherical. The fifth lens may be formed of a material having high light transmittance and excellent workability. For example, the fifth lens may be formed of a plastic material. The fifth lens may be configured to have a predetermined refractive index. For example, the refractive index of the fifth lens may be greater than 1.6. As a specific example, the refractive index of the fifth lens may be greater than 1.60 and less than 1.74. The fifth lens may have a predetermined Abbe number. For example, the Abbe number of the fifth lens may be 20 or more. As a specific example, the Abbe number of the fifth lens may be greater than 20 and less than 30.

The sixth lens has refractive power. For example, the sixth lens may have positive refractive power. One surface of the sixth lens may be convex. For example, an object-side surface of the sixth lens may be convex. The sixth lens includes an aspherical surface. For example, both surfaces of the sixth lens may be spherical. The sixth lens may be formed of a material having high light transmittance and excellent workability. For example, the sixth lens may be formed of a plastic material. The sixth lens may be configured to have a predetermined refractive index. For example, the refractive index of the sixth lens may be greater than 1.50 and less than 1.60. The sixth lens may have a predetermined Abbe number. For example, the Abbe number of the sixth lens may be greater than 50 and less than 60.

The seventh lens has refractive power. For example, the seventh lens may have negative refractive power. One surface of the seventh lens may be concave. For example, the image-side surface of the seventh lens may be concave. The seventh lens includes an aspherical surface. For example, both surfaces of the seventh lens may be aspherical. The seventh lens may have an inflection point. For example, at least one of an object-side surface and an image-side surface of the seventh lens may have an inflection point. The seventh lens may be formed of a material having high light transmittance and excellent workability. For example, the seventh lens may be formed of a plastic or glass material. The seventh lens may be configured to have a predetermined refractive index. For example, the refractive index of the seventh lens may be greater than 1.60 and less than 1.70. The seventh lens may have a predetermined Abbe number. For example, the Abbe number of the seventh lens may be greater than 20 and less than 30.

The eighth lens has refractive power. For example, the eighth lens may have positive refractive power. One surface of the eighth lens may be convex. For example, an object-side surface of the eighth lens may be convex. The eighth lens includes an aspherical surface. For example, both surfaces of the eighth lens may be spherical. The eighth lens may be formed of a material having high light transmittance and excellent workability. For example, the eighth lens may be formed of a plastic material. The eighth lens may be configured to have a predetermined refractive index. For example, the refractive index of the eighth lens may be greater than 1.50 and less than 1.60. The eighth lens may have a predetermined Abbe number. For example, the Abbe number of the eighth lens may be greater than 50 and less than 60.

The aspherical surfaces of the lenses described above may be expressed by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \ldots \quad \text{Equation 1}$$

In Equation 1, c is the reciprocal of a radius of curvature of the corresponding lens, k is a conic constant, r is a distance from a certain point on the aspherical surface to an optical axis, A to H and J are aspheric constants, and Z (or SAG) is a height from a certain point on the aspherical surface to an apex of the corresponding aspherical surface in an optical axis direction.

The imaging lens system according to the aspect described above may further include a stop, a filter, and a protective glass. For example, the imaging lens system may further include a stop disposed on the second lens and the third lens. The stop may be configured to adjust the amount of light incident in a direction of the imaging plane. As another example, the imaging lens system may further include a filter and protective glass disposed between the eighth lens and the imaging plane. The filter may be configured to block light of a specific wavelength, and the protective glass may be configured to block foreign substances or the like introduced in the direction of the imaging plane. For reference, one or more of the filter, the protective glass, or cover glass may be omitted if necessary.

Hereinafter, specific example embodiments of the imaging lens system will be described with reference to the drawings.

First, the imaging lens system according to the first example embodiment will be described with reference to FIG. 1.

An imaging lens system 100 includes a first lens 110, a second lens 120, a third lens 130, a fourth lens 140, a fifth lens 150, a sixth lens 160, a seventh lens 170, and an eighth lens 180.

The first lens 110 has negative refractive power and has a convex object-side surface and a concave image-side surface. The second lens 120 has positive refractive power and has a concave object-side surface and a convex image-side surface. The third lens 130 has positive refractive power and has a concave object-side surface and a convex image-side surface. The fourth lens 140 has positive refractive power and has a convex object-side surface and a convex image-side surface. The fifth lens 150 has negative refractive power and has a concave object-side surface and a concave image-side surface. The sixth lens 160 has positive refractive power and has a convex object-side surface and a convex image-side surface. The seventh lens 170 has negative refractive power and has a convex object-side surface and a concave image-side surface. In addition, the object-side surface of the seventh lens 170 has an inflection point. The eighth lens 180 has positive refractive power and has a convex object-side surface and a concave image-side surface. A stop ST is disposed between the second lens 120 and the third lens 130.

The imaging lens system 100 may further include a filter IF and an imaging plane IP. The filter IF may be disposed between the eighth lens 180 and the imaging plane IP. The filter IF may be omitted if necessary. The imaging plane IP may be formed on one surface of the image sensor IS of a camera module or inside the image sensor IS. However, a location of the imaging plane IP is not limited to one surface or the inside of the image sensor IS.

Figure 2:
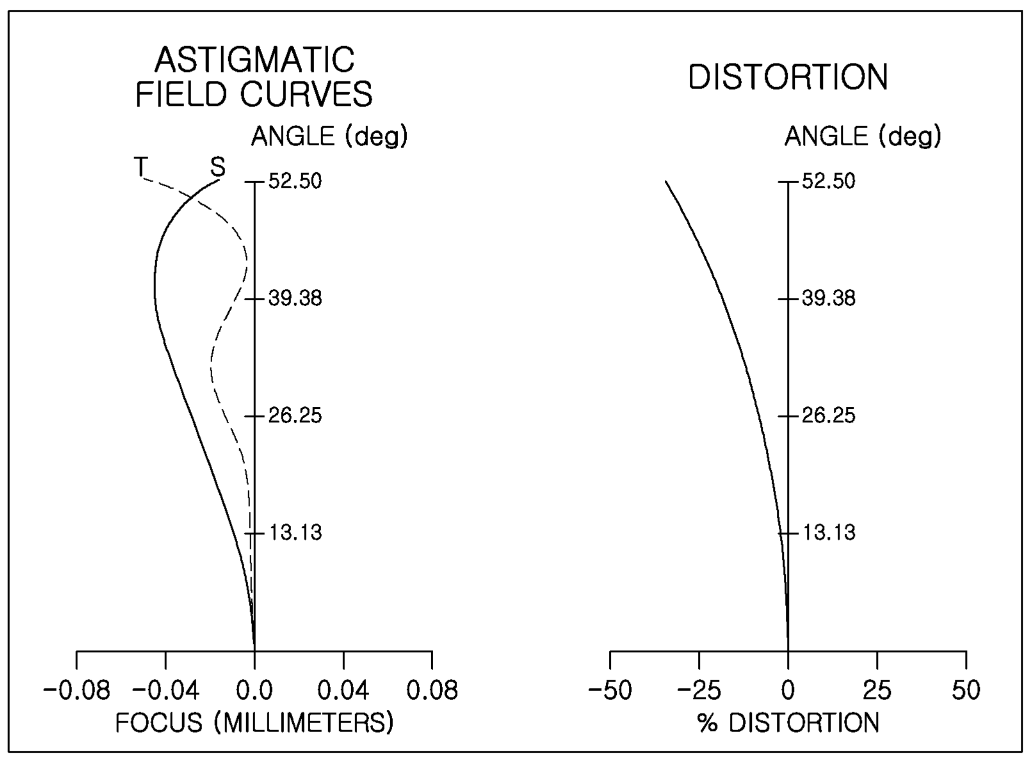
FIG. 2 displays aberration curves of the imaging lens system illustrated in FIG. 1.

Table 1 and Table 2 illustrate lens characteristics and aspherical surface values of the imaging lens system according to the present example embodiment, and FIG. 2 displays aberration curves of the imaging lens system according to the present example embodiment.

TABLE 1

| Surface No. | Component | Radius of Curvature | Thickness/ Distance | Refractive Index | Abbe Number | Effective Radius |
|---|---|---|---|---|---|---|
| S1 | First Lens | 300.236 | 0.900 | 1.773 | 49.6 | 4.783 |
| S2 | | 4.8153 | 2.237 | | | 3.546 |
| S3 | Second Lens | −925.249 | 2.366 | 1.614 | 25.6 | 3.503 |
| S4 | | −10.4928 | 0.400 | | | 3.719 |
| S5 | Stop | Infinity | 0.997 | | | 3.354 |
| S6 | Third Lens | −5.0423 | 1.440 | 1.537 | 56.0 | 3.409 |
| S7 | | −4.8469 | 0.800 | | | 3.714 |
| S8 | Fourth Lens | 14.1033 | 4.000 | 1.739 | 49.1 | 4.360 |
| S9 | | −8.7207 | 0.400 | | | 4.557 |
| S10 | Fifth Lens | −6.6565 | 0.900 | 1.656 | 21.2 | 4.487 |
| S11 | | 124.594 | 0.400 | | | 4.654 |
| S12 | Sixth Lens | 20.3077 | 3.015 | 1.537 | 56.0 | 5.157 |
| S13 | | −13.7704 | 0.400 | | | 5.070 |
| S14 | Seventh Lens | 8.3385 | 1.343 | 1.614 | 25.6 | 4.825 |
| S15 | | 5.1532 | 1.749 | | | 4.522 |
| S16 | Eighth Lens | 8.9394 | 2.677 | 1.537 | 56.0 | 5.594 |
| S17 | | 73.4341 | 0.700 | | | 5.481 |
| S18 | Filter | Infinity | 0.900 | 1.519 | 64.2 | 5.469 |
| S19 | | Infinity | 3.300 | | | 5.438 |
| S20 | Imaging Plane | Infinity | 0.000 | | | 5.280 |

TABLE 2

| Surface No. | S3 | S4 | S6 | S7 | S8 | S9 | S10 |
|---|---|---|---|---|---|---|---|
| K | 0.00000 | 2.13017 | 0.00000 | −1.27527 | −9.40539 | 0.00000 | −7.15010 |
| A | −0.38802 | −0.22302 | 0.51985 | 0.26818 | 0.02484 | 0.12579 | −0.21371 |
| B | −0.02194 | 0.00315 | 0.01386 | 0.00132 | 0.00847 | 0.00520 | 0.02892 |
| C | −0.00198 | −0.00208 | −0.00202 | −0.00345 | −0.00217 | −0.00118 | −0.00425 |
| D | −0.00010 | 0 | 0.00025 | 0.00015 | 0 | 0 | 0 |

TABLE 2-continued

| | | | | | | | |
|---|---|---|---|---|---|---|---|
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |
| Surface No. | S11 | S12 | S13 | S14 | S15 | S16 | S17 |
| K | 0.00000 | 0.00000 | 0.00000 | 0.00000 | −4.95876 | 0.00000 | 0.00000 |
| A | 0.12875 | 0.90105 | 0.53482 | −1.38734 | 0.11441 | 0.21620 | 0.29596 |
| B | 0.03797 | −0.04686 | −0.06874 | 0.16847 | 0.10553 | 0.00933 | −0.00877 |
| C | −0.00737 | −0.00148 | 0.01011 | −0.02306 | −0.00978 | −0.00198 | −0.00180 |
| D | 0 | 0.00177 | 0 | 0.00136 | 0 | 0 | −0.00188 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

Figure 3:
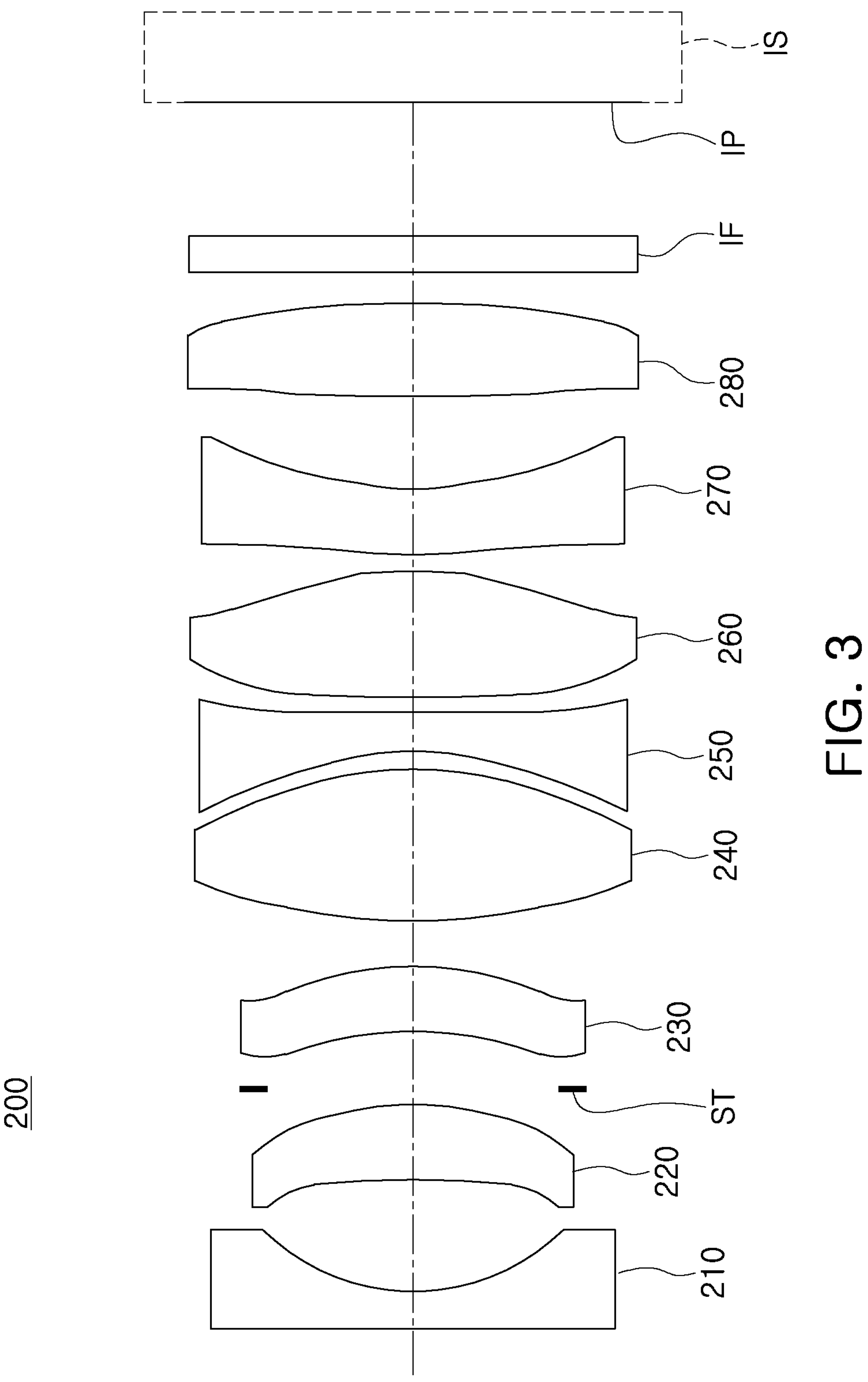
FIG. 3 is a configuration diagram of an imaging lens system according to a second example embodiment.

An imaging lens system according to a second example embodiment will be described with reference to FIG. 3.

An imaging lens system 200 includes a first lens 210, a second lens 220, a third lens 230, a fourth lens 240, a fifth lens 250, a sixth lens 260, a seventh lens 270, and an eighth lens 280.

The first lens 210 has negative refractive power and has a concave object-side surface and a concave image-side surface. The second lens 220 has positive refractive power and has a concave object-side surface and a convex image-side surface. The third lens 230 has positive refractive power and has a concave object-side surface and a convex image-side surface. The fourth lens 240 has positive refractive power and has a convex object-side surface and a convex image-side surface. The fifth lens 250 has negative refractive power and has a concave object-side surface and a concave image-side surface. The sixth lens 260 has positive refractive power and has a convex object-side surface and a convex image-side surface. The seventh lens 270 has negative refractive power and has a convex object-side surface and a concave image-side surface. In addition, the object-side surface of the seventh lens 270 has an inflection point. The eighth lens 280 has positive refractive power and has a convex object-side surface and a convex image-side surface. A stop ST is disposed between the second lens 220 and the third lens 230.

The imaging lens system 200 may further include a filter IF and an imaging plane IP. The filter IF may be disposed between the eighth lens 280 and the imaging plane IP. The filter IF may be omitted if necessary. The imaging plane IP may be formed on one surface of the image sensor IS of a camera module or inside the image sensor IS. However, the location of the imaging plane IP is not limited to one surface or the inside of the image sensor IS.

Figure 4:
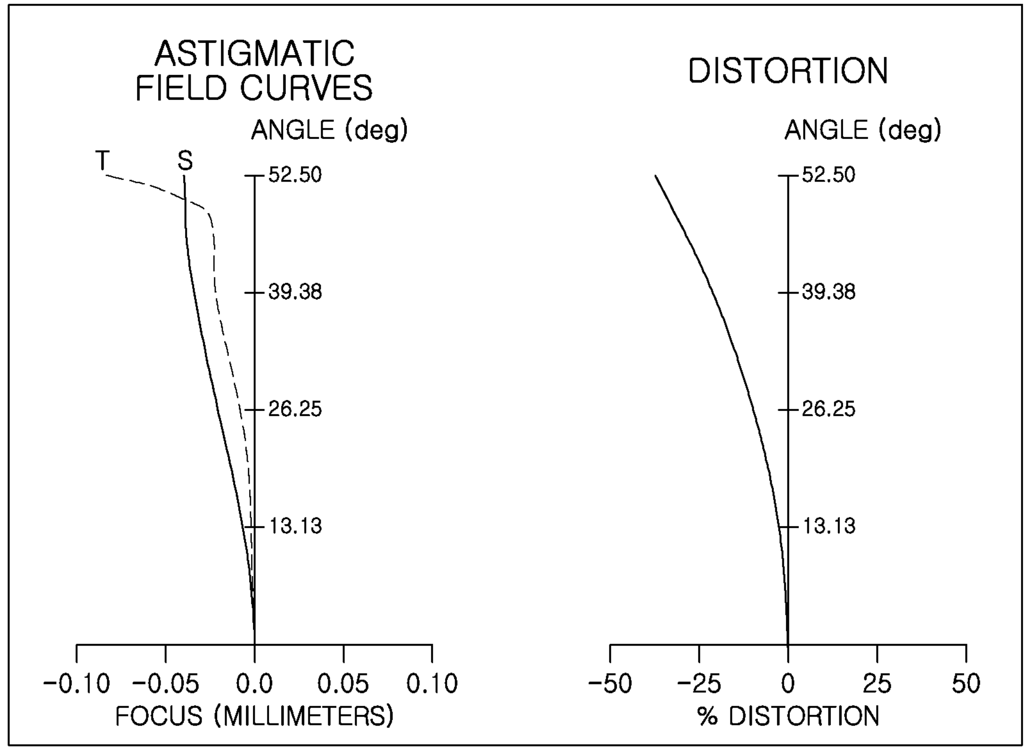
FIG. 4 displays aberration curves of the imaging lens system illustrated in FIG. 3.

Table 3 and Table 4 illustrate lens characteristics and aspherical surface values of the imaging lens system according to the present example embodiment, and FIG. 4 displays aberration curves of the imaging lens system according to the present example embodiment.

TABLE 3

| Surface No. | Component | Radius of Curvature | Thickness/ Distance | Refractive Index | Abbe Number | Effective Radius |
|---|---|---|---|---|---|---|
| S1 | First Lens | −632.799 | 0.900 | 1.776 | 49.6 | 4.679 |
| S2 | | 5.0421 | 2.615 | | | 3.520 |
| S3 | Second Lens | −53.8049 | 1.742 | 1.620 | 25.6 | 3.419 |
| S4 | | −9.1925 | 0.400 | | | 3.699 |
| S5 | Stop | Infinity | 1.385 | | | 3.377 |
| S6 | Third Lens | −5.2796 | 1.537 | 1.539 | 56.0 | 3.672 |
| S7 | | −5.3810 | 1.034 | | | 3.973 |
| S8 | Fourth Lens | 13.1756 | 3.586 | 1.743 | 49.1 | 5.049 |
| S9 | | −8.2350 | 0.400 | | | 5.077 |
| S10 | Fifth Lens | −7.6370 | 0.900 | 1.663 | 21.2 | 4.945 |
| S11 | | 53.9939 | 0.400 | | | 4.991 |
| S12 | Sixth Lens | 115.417 | 3.000 | 1.539 | 56.0 | 5.191 |
| S13 | | −7.6419 | 0.400 | | | 5.106 |
| S14 | Seventh Lens | 10.9693 | 1.517 | 1.620 | 25.6 | 4.923 |
| S15 | | 5.9356 | 2.200 | | | 4.779 |
| S16 | Eighth Lens | 66.9373 | 2.212 | 1.539 | 56.0 | 5.003 |
| S17 | | −21.1103 | 0.700 | | | 5.210 |
| S18 | Filter | Infinity | 0.900 | 1.519 | 64.2 | 5.216 |
| S19 | | Infinity | 3.300 | | | 5.219 |
| S20 | Imaging Plane | Infinity | 0.000 | | | 5.282 |

TABLE 4

| Surface No. | S3 | S4 | S6 | S7 | S8 | S9 | S10 |
|---|---|---|---|---|---|---|---|
| K | 0.00000 | 0.64509 | 0.00000 | −1.51671 | −7.91099 | 0.00000 | −7.22130 |
| A | −0.50830 | −0.33871 | 0.83951 | 0.47577 | 0.12836 | 0.31122 | −0.35292 |
| B | −0.04352 | −0.01822 | 0.02426 | 0.03341 | 0.02978 | 0.02644 | 0.06097 |
| C | −0.00464 | −0.00141 | 0.00192 | 0.00470 | 0.00099 | 0.00243 | −0.00676 |
| D | −0.00035 | 0 | 0 | 0.00070 | 0 | 0 | 0 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

| Surface No. | S11 | S12 | S13 | S14 | S15 | S16 | S17 |
|---|---|---|---|---|---|---|---|
| K | 0.00000 | 0.00000 | 0.00000 | 0.00000 | −6.24729 | 0.00000 | 0.00000 |
| A | 0.08552 | 0.77534 | 0.78755 | −1.08470 | −0.05876 | 0.03223 | −0.00630 |
| B | 0.05727 | 0.00501 | 0.05245 | 0.18080 | 0.09208 | −0.00219 | −0.02880 |
| C | −0.01385 | 0.00266 | 0.01592 | −0.03016 | −0.02933 | −0.02831 | −0.02469 |
| D | 0 | 0 | 0 | −0.00034 | 0 | 0 | 0.00034 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

Figure 5:
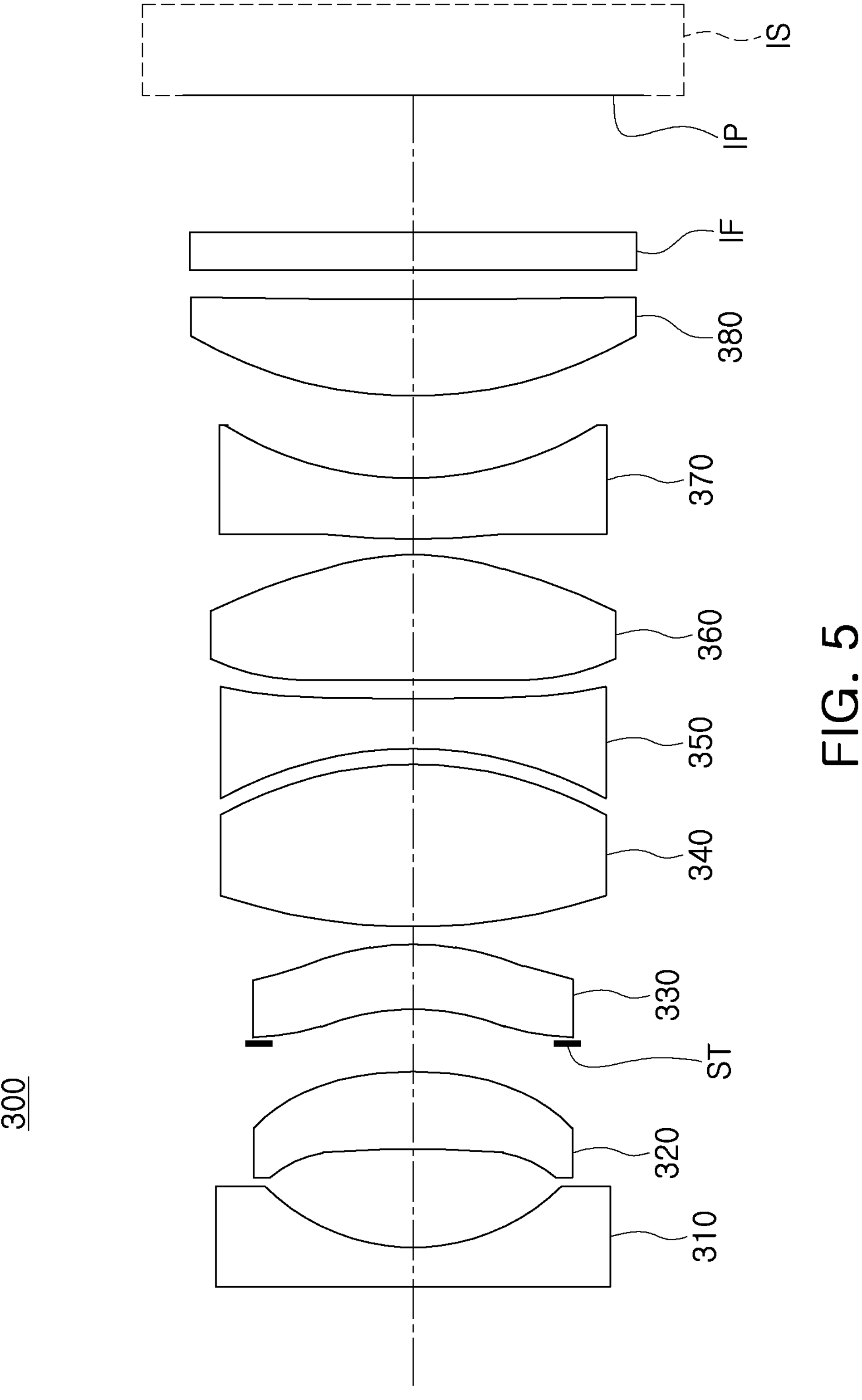
FIG. 5 is a configuration diagram of an imaging lens system according to a third example embodiment.

An imaging lens system according to a third example embodiment will be described with reference to FIG. 5.

An imaging lens system 300 includes a first lens 310, a second lens 320, a third lens 330, a fourth lens 340, a fifth lens 350, a sixth lens 360, a seventh lens 370, and an eighth lens 380.

The first lens 310 has negative refractive power and has a concave object-side surface and a concave image-side surface. The second lens 320 has positive refractive power and has a concave object-side surface and a convex image-side surface. The third lens 330 has positive refractive power and has a concave object-side surface and a convex image-side surface. The fourth lens 340 has positive refractive power and has a convex object-side surface and a convex image-side surface. The fifth lens 350 has negative refractive power and has a concave object-side surface and a concave image-side surface. The sixth lens 360 has positive refractive power and has a convex object-side surface and a convex image-side surface. The seventh lens 370 has negative refractive power and has a convex object-side surface and a concave image-side surface. The eighth lens 380 has positive refractive power and has a convex object-side surface and a concave image-side surface. A stop ST is disposed between the second lens 320 and the third lens 330.

The imaging lens system 300 may further include a filter IF and an imaging plane IP. The filter IF may be disposed between the eighth lens 380 and the imaging plane IP. The filter IF may be omitted if necessary. The imaging plane IP may be formed on one surface of the image sensor IS of a camera module or inside the image sensor IS. However, the location of the imaging plane IP is not limited to one surface or the inside of the image sensor IS.

Figure 6:
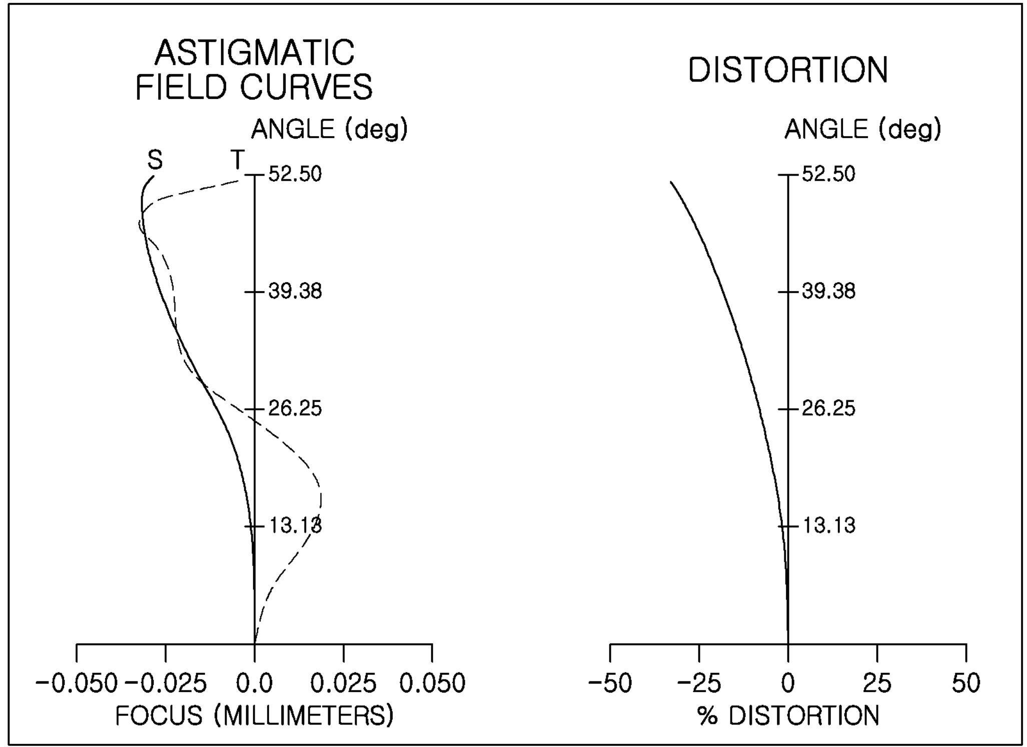
FIG. 6 displays aberration curves of the imaging lens system illustrated in FIG. 5.

Table 5 and Table 6 illustrate lens characteristics and aspherical surface values of the imaging lens system according to the present example embodiment, and FIG. 6 displays aberration curves of the imaging lens system according to the present example embodiment.

TABLE 5

| Surface No. | Component | Radius of Curvature | Thickness/ Distance | Refractive Index | Abbe Number | Effective Radius |
|---|---|---|---|---|---|---|
| S1 | First Lens | −255.307 | 0.900 | 1.776 | 49.6 | 4.682 |
| S2 | | 4.9750 | 2.397 | | | 3.518 |
| S3 | Second Lens | −51.7250 | 1.815 | 1.620 | 25.6 | 3.484 |
| S4 | | −8.9060 | 0.646 | | | 3.800 |
| S5 | Stop | Infinity | 0.800 | | | 3.405 |
| S6 | Third Lens | −5.3440 | 1.606 | 1.539 | 56.0 | 3.481 |
| S7 | | −5.4760 | 0.400 | | | 3.820 |
| S8 | Fourth Lens | 12.5360 | 3.830 | 1.743 | 49.1 | 4.552 |
| S9 | | −8.3060 | 0.400 | | | 4.593 |
| S10 | Fifth Lens | −7.7010 | 1.187 | 1.663 | 21.2 | 4.483 |
| S11 | | 45.8130 | 0.400 | | | 4.598 |
| S12 | Sixth Lens | 499.445 | 3.000 | 1.539 | 56.0 | 4.801 |
| S13 | | −7.0410 | 0.400 | | | 4.814 |
| S14 | Seventh Lens | 11.4730 | 1.440 | 1.620 | 25.6 | 4.605 |
| S15 | | 5.4340 | 1.996 | | | 4.468 |
| S16 | Eighth Lens | 11.6450 | 2.263 | 1.539 | 56.0 | 5.285 |
| S17 | | 4489.017 | 0.700 | | | 5.265 |
| S18 | Filter | Infinity | 0.900 | 1.519 | 64.2 | 5.266 |
| S19 | | Infinity | 3.300 | | | 5.267 |
| S20 | Imaging Plane | Infinity | 0.000 | | | 5.276 |

TABLE 6

| Surface No. | S3 | S4 | S6 | S7 | S8 | S9 | S10 |
|---|---|---|---|---|---|---|---|
| K | 0.00000 | 0.72825 | 0.00000 | −1.54307 | −8.38726 | 0.00000 | −7.38961 |
| A | −0.56941 | −0.39243 | 0.67628 | 0.40105 | 0.05797 | 0.18876 | −0.25385 |
| B | −0.04355 | −0.01439 | 0.01230 | 0.02056 | 0.02515 | 0.01343 | 0.02280 |
| C | −0.00389 | −0.00246 | 0.00060 | 0.00085 | −0.00177 | −0.00042 | 0.00005 |
| D | −0.00019 | 0 | 0 | 0.00045 | 0 | 0 | 0 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

| Surface No. | S11 | S12 | S13 | S14 | S15 | S16 | S17 |
|---|---|---|---|---|---|---|---|
| K | 0.00000 | 0.00000 | 0.00000 | 0.00000 | −5.45348 | 0.00000 | 0.00000 |
| A | 0.01776 | 0.55200 | 0.56922 | −0.97579 | 0.00583 | 0.13020 | 0.05130 |
| B | 0.04605 | −0.00180 | 0.02455 | 0.16717 | 0.09673 | 0.04066 | 0.02007 |
| C | −0.00216 | 0.00421 | 0.01073 | −0.02092 | −0.01784 | −0.00972 | −0.00400 |
| D | 0 | 0 | 0 | 0.00007 | 0 | 0 | −0.00104 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

Figure 7:
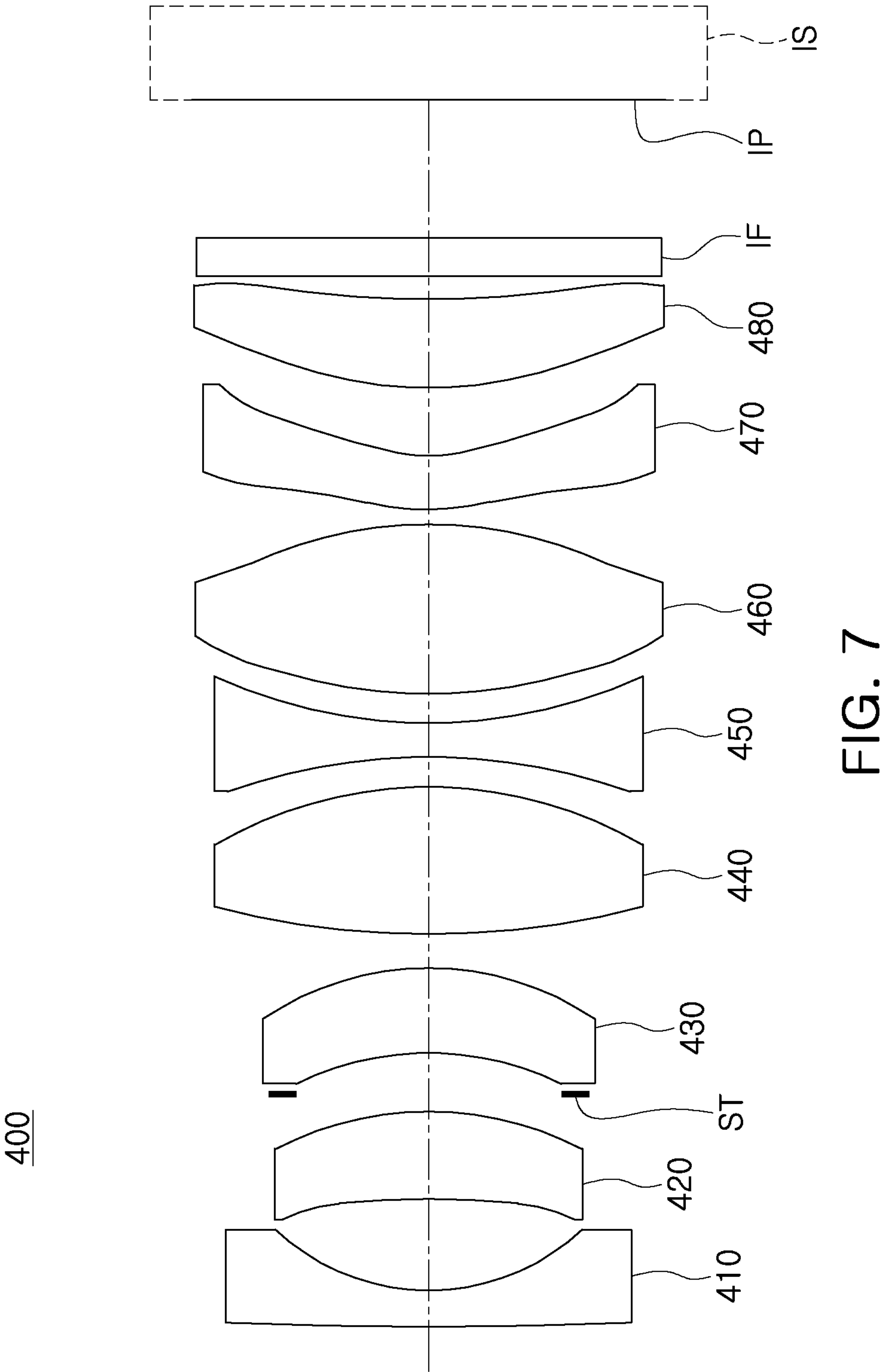
FIG. 7 is a configuration diagram of an imaging lens system according to a fourth example embodiment.

An imaging lens system according to a fourth example embodiment will be described with reference to FIG. 7.

An imaging lens system 400 includes a first lens 410, a second lens 420, a third lens 430, a fourth lens 440, a fifth lens 450, a sixth lens 460, a seventh lens 470, and an eighth lens 480.

The first lens 410 has negative refractive power and has a convex object-side surface and a concave image-side surface. The second lens 420 has positive refractive power and has a concave object-side surface and a convex image-side surface. The third lens 430 has positive refractive power and has a concave object-side surface and a convex image-side surface. The fourth lens 440 has positive refractive power and has a convex object-side surface and a convex image-side surface. The fifth lens 450 has negative refractive power and has a concave object-side surface and a concave image-side surface. The sixth lens 460 has positive refractive power and has a convex object-side surface and a convex image-side surface. The seventh lens 470 has negative refractive power and has a convex object-side surface and a concave image-side surface. In addition, the object-side surface of the seventh lens 470 has an inflection point. The eighth lens 480 has positive refractive power and has a convex object-side surface and a concave image-side surface. A stop ST is disposed between the second lens 420 and the third lens 430.

The imaging lens system 400 may further include a filter IF and an imaging plane IP. The filter IF may be disposed between the eighth lens 480 and the imaging plane IP. The filter IF may be omitted if necessary. The imaging plane IP may be formed on one surface of the image sensor IS of a camera module or inside the image sensor IS. However, the location of the imaging plane IP is not limited to one surface or the inside of the image sensor IS.

Figure 8:
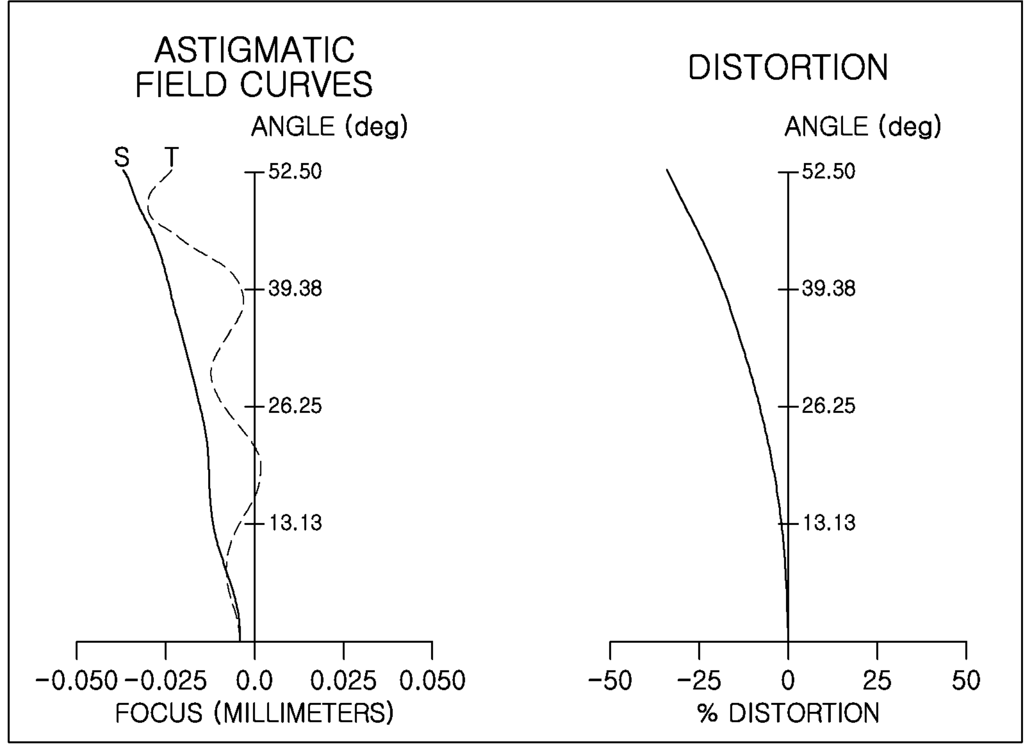
FIG. 8 displays aberration curves of the imaging lens system illustrated in FIG. 7.

Table 7 and Table 8 illustrate lens characteristics and aspherical surface values of the imaging lens system according to the present example embodiment, and FIG. 8 displays aberration curves of the imaging lens system according to the present example embodiment.

TABLE 7

| Surface No. | Component | Radius of Curvature | Thickness/ Distance | Refractive Index | Abbe Number | Effective Radius |
|---|---|---|---|---|---|---|
| S1 | First Lens | 128.728 | 0.900 | 1.775 | 49.6 | 4.782 |
| S2 | | 5.2030 | 2.144 | | | 3.593 |
| S3 | Second Lens | −31.4430 | 2.089 | 1.619 | 25.6 | 3.541 |
| S4 | | −9.3090 | 0.444 | | | 3.615 |
| S5 | Stop | Infinity | 0.971 | | | 3.101 |
| S6 | Third Lens | −6.4780 | 2.046 | 1.538 | 56.0 | 3.178 |
| S7 | | −6.4450 | 0.800 | | | 3.874 |
| S8 | Fourth Lens | 13.8600 | 3.500 | 1.742 | 49.1 | 4.794 |
| S9 | | −9.9920 | 0.690 | | | 5.042 |
| S10 | Fifth Lens | −14.2680 | 0.781 | 1.662 | 21.2 | 4.834 |
| S11 | | 9.0280 | 0.720 | | | 5.009 |
| S12 | Sixth Lens | 11.6180 | 4.000 | 1.538 | 56.0 | 5.451 |
| S13 | | −9.6090 | 0.400 | | | 5.481 |
| S14 | Seventh Lens | 6.4860 | 1.267 | 1.619 | 25.6 | 5.315 |
| S15 | | 4.2270 | 1.621 | | | 4.946 |
| S16 | Eighth Lens | 7.3830 | 2.066 | 1.538 | 56.0 | 5.355 |
| S17 | | 15.8040 | 0.578 | | | 5.391 |
| S18 | Filter | Infinity | 0.900 | 1.518 | 64.2 | 5.378 |
| S19 | | Infinity | 3.310 | | | 5.344 |
| S20 | Imaging Plane | Infinity | 0.004 | | | 5.285 |

TABLE 8

| Surface No. | S3 | S4 | S6 | S7 | S8 | S9 | S10 |
|---|---|---|---|---|---|---|---|
| K | 0.00000 | −0.48236 | 0.00000 | −0.59796 | −4.04617 | 0.00000 | −30.40330 |
| A | −0.29472 | −0.17735 | 0.08048 | −0.00515 | −0.20678 | −0.04461 | −0.33474 |
| B | −0.01143 | −0.00655 | −0.01362 | −0.02574 | 0.00523 | −0.00142 | 0.00590 |
| C | −0.00073 | −0.00019 | −0.00021 | 0.00020 | −0.00002 | 0.00085 | 0.00574 |
| D | 0 | 0 | 0 | 0 | 0 | 0 | 0 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |
| Surface No. | S11 | S12 | S13 | S14 | S15 | S16 | S17 |
| K | 0.00000 | 0.00000 | 0.00000 | 0.00000 | −3.90986 | 0.00000 | 0.00000 |
| A | −0.42278 | −0.09266 | 0.27991 | −2.13626 | −0.30731 | −0.95139 | −0.59083 |
| B | 0.01545 | 0.06324 | 0.09288 | 0.29682 | 0.25039 | 0.11858 | −0.00959 |
| C | 0.00046 | −0.00004 | 0.00782 | −0.05863 | −0.02534 | −0.03923 | −0.03595 |
| D | 0 | 0.00049 | 0 | 0 | 0 | 0 | −0.00003 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

Figure 9:
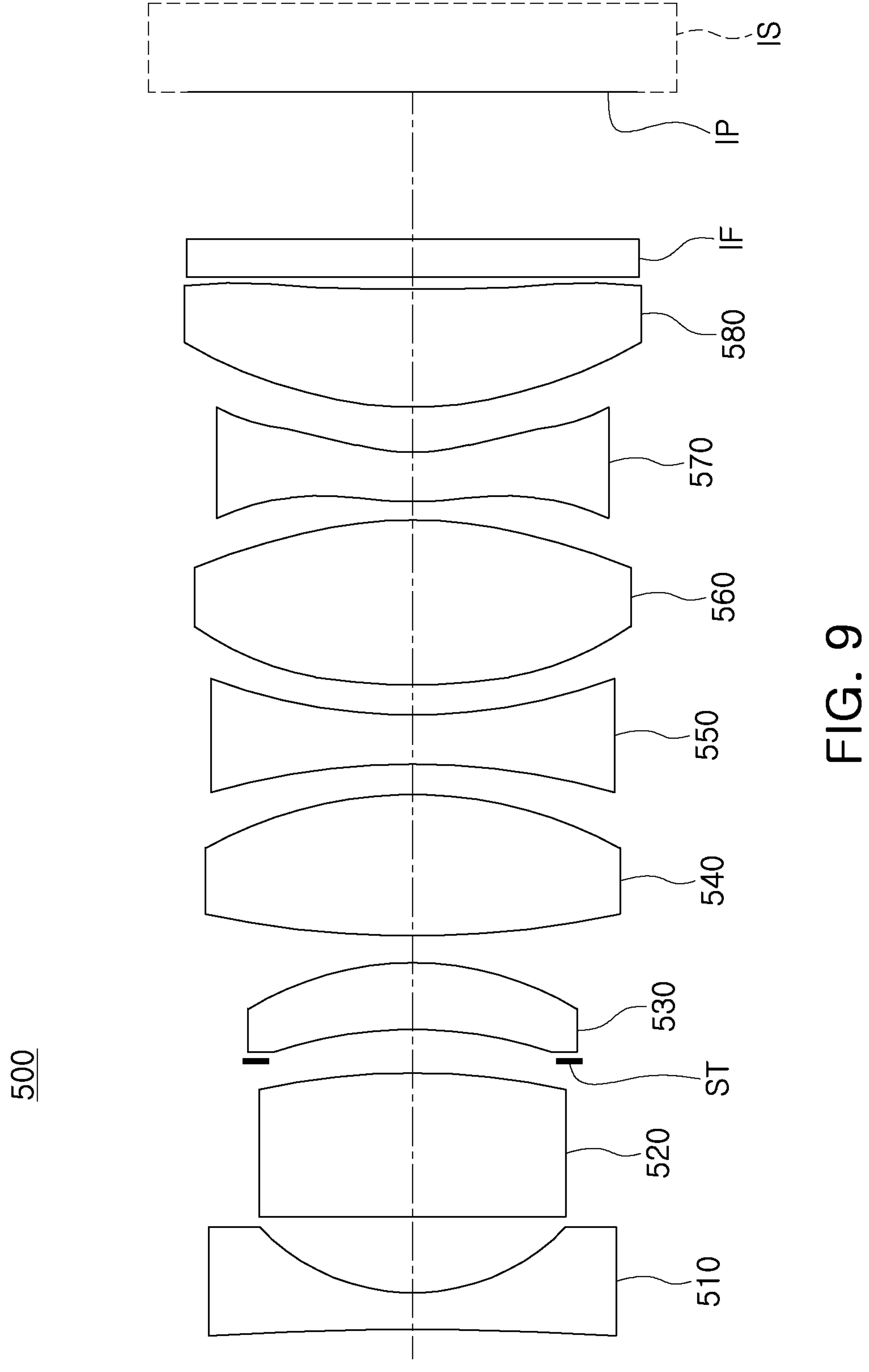
FIG. 9 is a configuration diagram of an imaging lens system according to a fifth example embodiment.

An imaging lens system according to a fifth example embodiment will be described with reference to FIG. 9.

An imaging lens system 500 includes a first lens 510, a second lens 520, a third lens 530, a fourth lens 540, a fifth lens 550, a sixth lens 560, a seventh lens 570, and an eighth lens 580.

The first lens 510 has negative refractive power and has a concave object-side surface and a concave image-side surface. The second lens 520 has positive refractive power and has a convex object-side surface and a convex image-side surface. The third lens 530 has positive refractive power and has a concave object-side surface and a convex image-side surface. The fourth lens 540 has positive refractive power and has a convex object-side surface and a convex image-side surface. The fifth lens 550 has negative refractive power and has a concave object-side surface and a concave image-side surface. The sixth lens 560 has positive refractive power and has a convex object-side surface and a convex image-side surface. The seventh lens 570 has negative refractive power and has a convex object-side surface and a concave image-side surface. In addition, the object-side surface of the seventh lens 570 has an inflection point. The eighth lens 580 has positive refractive power and has a convex object-side surface and a concave image-side surface. A stop ST is disposed between the second lens 520 and the third lens 530.

The imaging lens system 500 may further include a filter IF and an imaging plane IP. The filter IF may be disposed between the eighth lens 580 and the imaging plane IP. The filter IF may be omitted if necessary. The imaging plane IP may be formed on one surface of the image sensor IS of a camera module or inside the image sensor IS. However, the location of the imaging plane IP is not limited to one surface or the inside of the image sensor IS.

Figure 10:
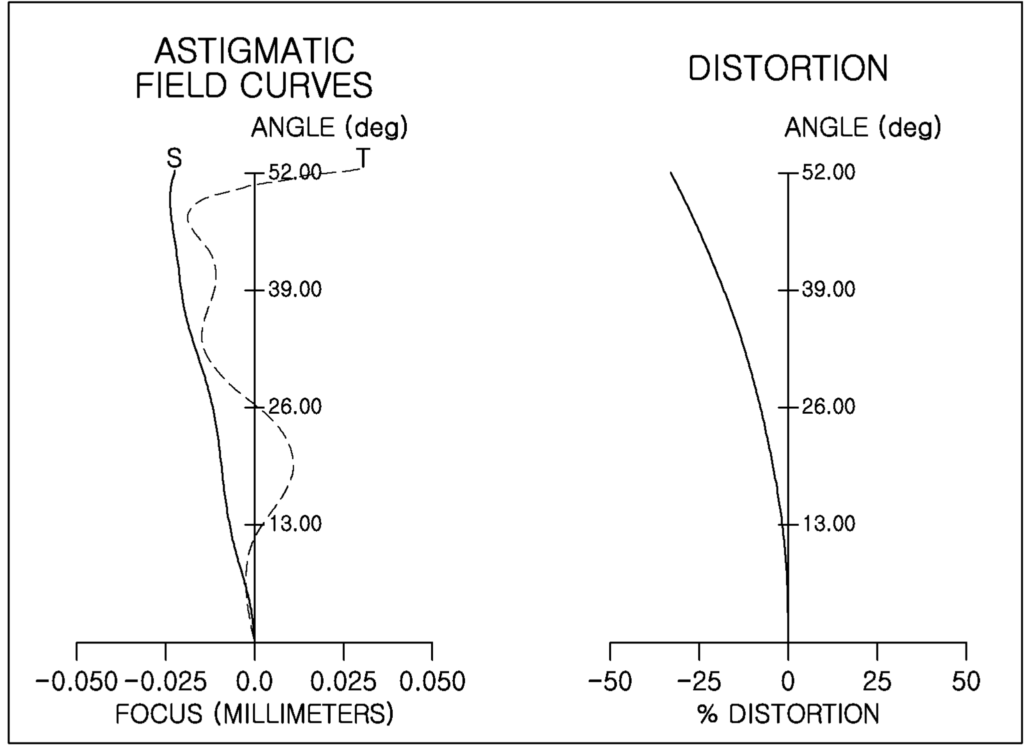
FIG. 10 displays aberration curves of the imaging lens system illustrated in FIG. 9.

Table 9 and Table 10 illustrate lens characteristics and aspherical surface values of the imaging lens system according to the present example embodiment, and FIG. 10 displays aberration curves of the imaging lens system according to the present example embodiment.

TABLE 9

| Surface No. | Component | Radius of Curvature | Thickness/ Distance | Refractive Index | Abbe Number | Effective Radius |
|---|---|---|---|---|---|---|
| S1 | First Lens | −92.5510 | 0.900 | 1.775 | 49.6 | 4.904 |
| S2 | | 4.9820 | 1.827 | | | 3.692 |
| S3 | Second Lens | 367.416 | 3.466 | 1.619 | 25.6 | 3.680 |
| S4 | | −12.2260 | 0.302 | | | 3.561 |
| S5 | Stop | Infinity | 0.817 | | | 3.420 |
| S6 | Third Lens | −7.4780 | 1.582 | 1.538 | 56.0 | 3.510 |
| S7 | | −6.4610 | 0.600 | | | 3.946 |
| S8 | Fourth Lens | 16.4200 | 3.501 | 1.742 | 49.1 | 4.732 |
| S9 | | −9.4860 | 0.688 | | | 4.919 |
| S10 | Fifth Lens | −16.5040 | 1.200 | 1.662 | 21.2 | 4.711 |
| S11 | | 11.3830 | 0.718 | | | 4.827 |
| S12 | Sixth Lens | 13.3880 | 4.000 | 1.538 | 56.0 | 5.225 |
| S13 | | −13.9470 | 0.468 | | | 5.115 |
| S14 | Seventh Lens | 8.5780 | 1.200 | 1.619 | 25.6 | 4.742 |
| S15 | | 4.7140 | 1.055 | | | 4.726 |
| S16 | Eighth Lens | 6.9630 | 2.857 | 1.538 | 56.0 | 5.370 |
| S17 | | 28.4440 | 0.278 | | | 5.432 |
| S18 | Filter | Infinity | 0.900 | 1.518 | 64.2 | 5.425 |
| S19 | | Infinity | 3.619 | | | 5.398 |
| S20 | Imaging Plane | Infinity | 0.000 | | | 5.250 |

TABLE 10

| Surface No. | S3 | S4 | S6 | S7 | S8 | S9 | S10 |
|---|---|---|---|---|---|---|---|
| K | 0.00000 | −8.98358 | 0.00000 | −1.03883 | −2.85853 | 0.00000 | −35.9411 |
| A | 0.00176 | 0.05084 | 0.28557 | 0.09549 | −0.10866 | 0.06213 | −0.23178 |
| B | 0.00267 | −0.00404 | −0.02578 | −0.03124 | 0.00665 | 0.00164 | −0.00776 |
| C | −0.00079 | −0.00221 | −0.00201 | −0.00182 | −0.00069 | 0.00019 | 0.00472 |
| D | 0 | 0 | 0 | 0 | 0 | 0 | 0 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |
| Surface No. | S11 | S12 | S13 | S14 | S15 | S16 | S17 |
| K | 0.00000 | 0.00000 | 0.00000 | 0.00000 | −4.35358 | 0.00000 | 0.00000 |
| A | −0.16856 | 0.38283 | −0.24937 | −2.03716 | −0.65158 | −1.03720 | −0.38337 |
| B | −0.00687 | 0.01402 | 0.07654 | 0.21786 | 0.22282 | 0.10875 | −0.00801 |
| C | −0.00103 | −0.00745 | −0.00253 | −0.01574 | −0.01970 | −0.03943 | −0.01291 |
| D | 0 | 0.00177 | 0 | 0 | 0 | 0 | −0.00235 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

Figure 11:
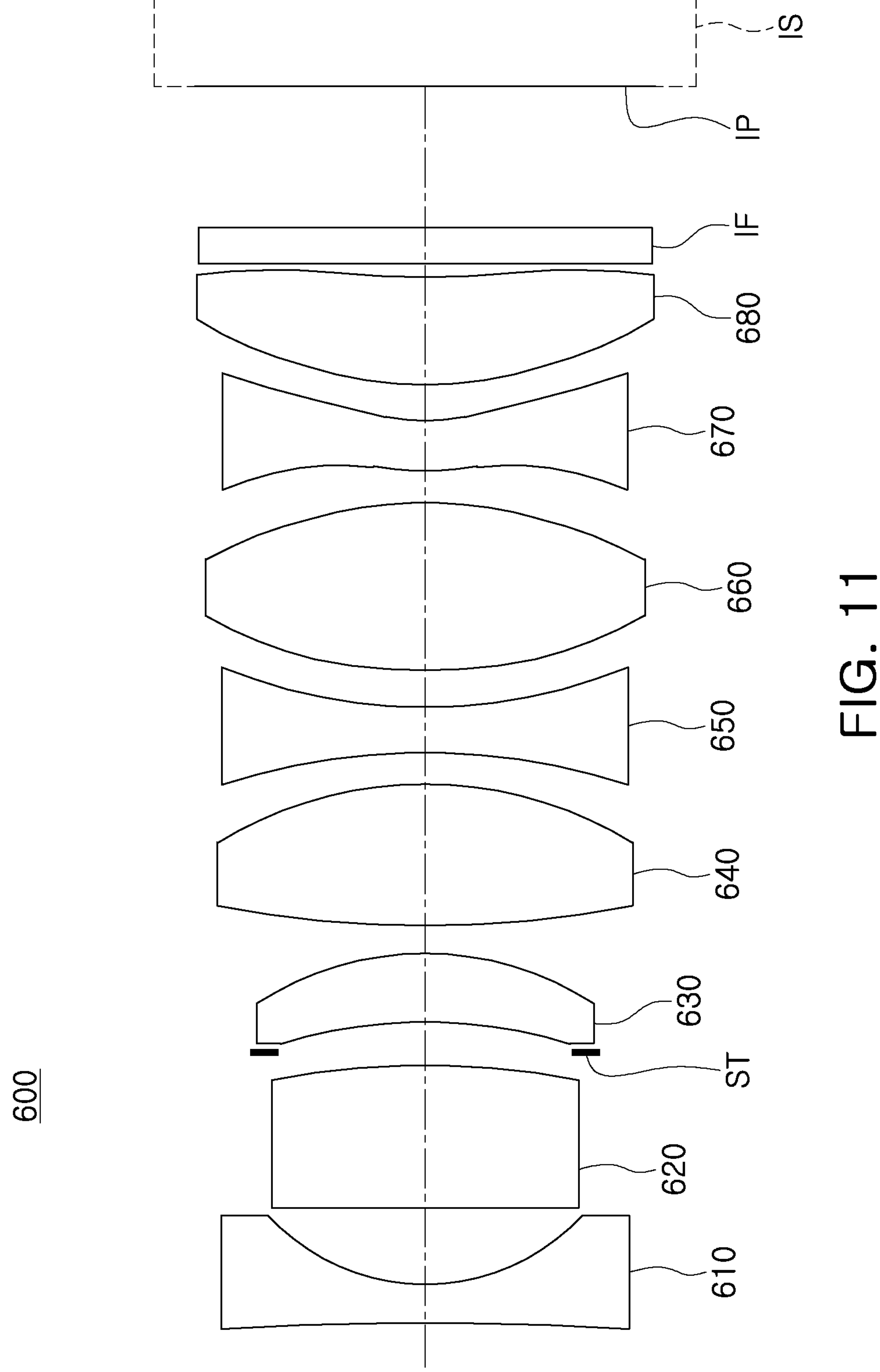
FIG. 11 is a configuration diagram of an imaging lens system according to a sixth example embodiment.

An imaging lens system according to a sixth example embodiment will be described with reference to FIG. 11.

An imaging lens system 600 includes a first lens 610, a second lens 620, a third lens 630, a fourth lens 640, a fifth lens 650, a sixth lens 660, a seventh lens 670, and an eighth lens 680.

The first lens 610 has negative refractive power and has a concave object-side surface and a concave image-side surface. The second lens 620 has positive refractive power and has a convex object-side surface and a convex image-side surface. The third lens 630 has positive refractive power and has a concave object-side surface and a convex image-side surface. The fourth lens 640 has positive refractive power and has a convex object-side surface and a convex image-side surface. The fifth lens 650 has negative refractive power and has a concave object-side surface and a concave image-side surface. The sixth lens 660 has positive refractive power and has a convex object-side surface and a convex image-side surface. The seventh lens 670 has negative refractive power and has a convex object-side surface and a concave image-side surface. In addition, the object-side surface of the seventh lens 670 has an inflection point. The eighth lens 680 has positive refractive power and has a convex object-side surface and a concave image-side surface. A stop ST is disposed between the second lens 620 and the third lens 630.

The imaging lens system 600 may further include a filter IF and an imaging plane IP. The filter IF may be disposed between the eighth lens 680 and the imaging plane IP. The filter IF may be omitted if necessary. The imaging plane IP may be formed on one surface of the image sensor IS of a camera module or inside the image sensor IS. However, the location of the imaging plane IP is not limited to one surface or the inside of the image sensor IS.

Figure 12:
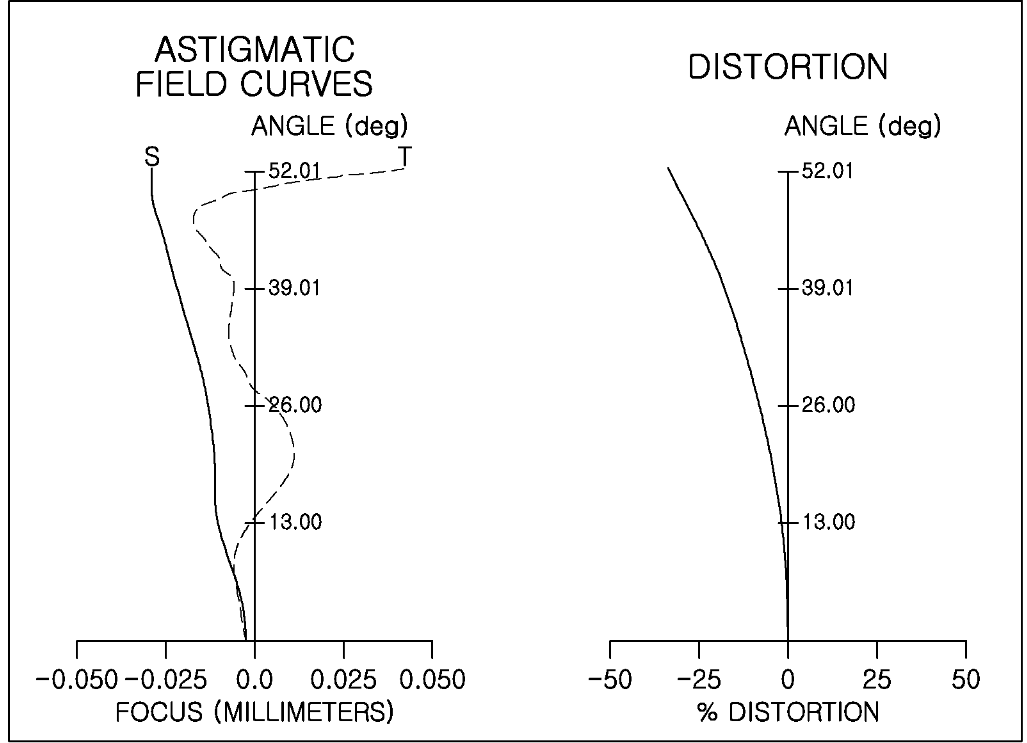
FIG. 12 displays aberration curves of the imaging lens system illustrated in FIG. 11.

Table 11 and Table 12 illustrate lens characteristics and aspherical surface values of the imaging lens system according to the present example embodiment, and FIG. 12 displays aberration curves of the imaging lens system according to the present example embodiment.

TABLE 11

| Surface No. | Component | Radius of Curvature | Thickness/ Distance | Refractive Index | Abbe Number | Effective Radius |
|---|---|---|---|---|---|---|
| S1 | First Lens | −89.4890 | 0.900 | 1.775 | 49.6 | 4.844 |
| S2 | | 4.9610 | 1.838 | | | 3.650 |
| S3 | Second Lens | 385.844 | 3.483 | 1.619 | 25.6 | 3.634 |
| S4 | | −12.6410 | 0.300 | | | 3.511 |
| S5 | Stop | Infinity | 0.758 | | | 3.439 |
| S6 | Third Lens | −7.4360 | 1.619 | 1.538 | 56.0 | 3.553 |
| S7 | | −6.3320 | 0.600 | | | 3.967 |
| S8 | Fourth Lens | 16.6730 | 3.501 | 1.742 | 49.1 | 4.734 |
| S9 | | −9.5000 | 0.688 | | | 4.943 |
| S10 | Fifth Lens | −18.2670 | 1.200 | 1.662 | 21.2 | 4.693 |
| S11 | | 11.9970 | 0.851 | | | 4.835 |
| S12 | Sixth Lens | 15.4520 | 4.000 | 1.538 | 56.0 | 5.221 |
| S13 | | −12.5960 | 0.795 | | | 5.178 |
| S14 | Seventh Lens | 9.4340 | 1.200 | 1.619 | 25.6 | 4.725 |
| S15 | | 4.5620 | 0.840 | | | 4.808 |
| S16 | Eighth Lens | 6.8820 | 2.649 | 1.538 | 56.0 | 5.337 |
| S17 | | 38.3690 | 0.278 | | | 5.387 |
| S18 | Filter | Infinity | 0.900 | 1.518 | 64.2 | 5.379 |
| S19 | | Infinity | 3.599 | | | 5.359 |
| S20 | Imaging Plane | Infinity | 0.000 | | | 5.251 |

TABLE 12

| Surface No. | S3 | S4 | S6 | S7 | S8 | S9 | S10 |
|---|---|---|---|---|---|---|---|
| K | 0.00000 | −11.49660 | 0.00000 | −0.99671 | −2.86450 | 0.00000 | −36.63820 |
| A | −0.01279 | 0.10544 | 0.38286 | 0.09579 | −0.12934 | 0.02519 | −0.26224 |
| B | 0.00251 | 0.00482 | −0.01619 | −0.01965 | 0.00462 | −0.00030 | −0.00715 |
| C | −0.00064 | −0.00120 | 0.00033 | 0.00042 | −0.00148 | −0.00090 | 0.00108 |
| D | 0 | 0 | 0 | 0 | 0 | 0 | 0 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

| Surface No. | S11 | S12 | S13 | S14 | S15 | S16 | S17 |
|---|---|---|---|---|---|---|---|
| K | 0.00000 | 0.00000 | 0.00000 | 0.00000 | −4.32642 | −0.02804 | 2.01537 |
| A | −0.09851 | 0.37017 | −0.22460 | −1.87037 | −0.62107 | −1.02695 | −0.34726 |
| B | −0.01015 | −0.00039 | 0.06538 | 0.20578 | 0.21278 | 0.10462 | −0.00228 |
| C | −0.00438 | −0.00609 | −0.00314 | −0.02402 | −0.03105 | −0.04152 | −0.01443 |
| D | 0 | 0.00111 | 0 | 0 | 0 | 0.00122 | −0.00127 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

Figure 13:
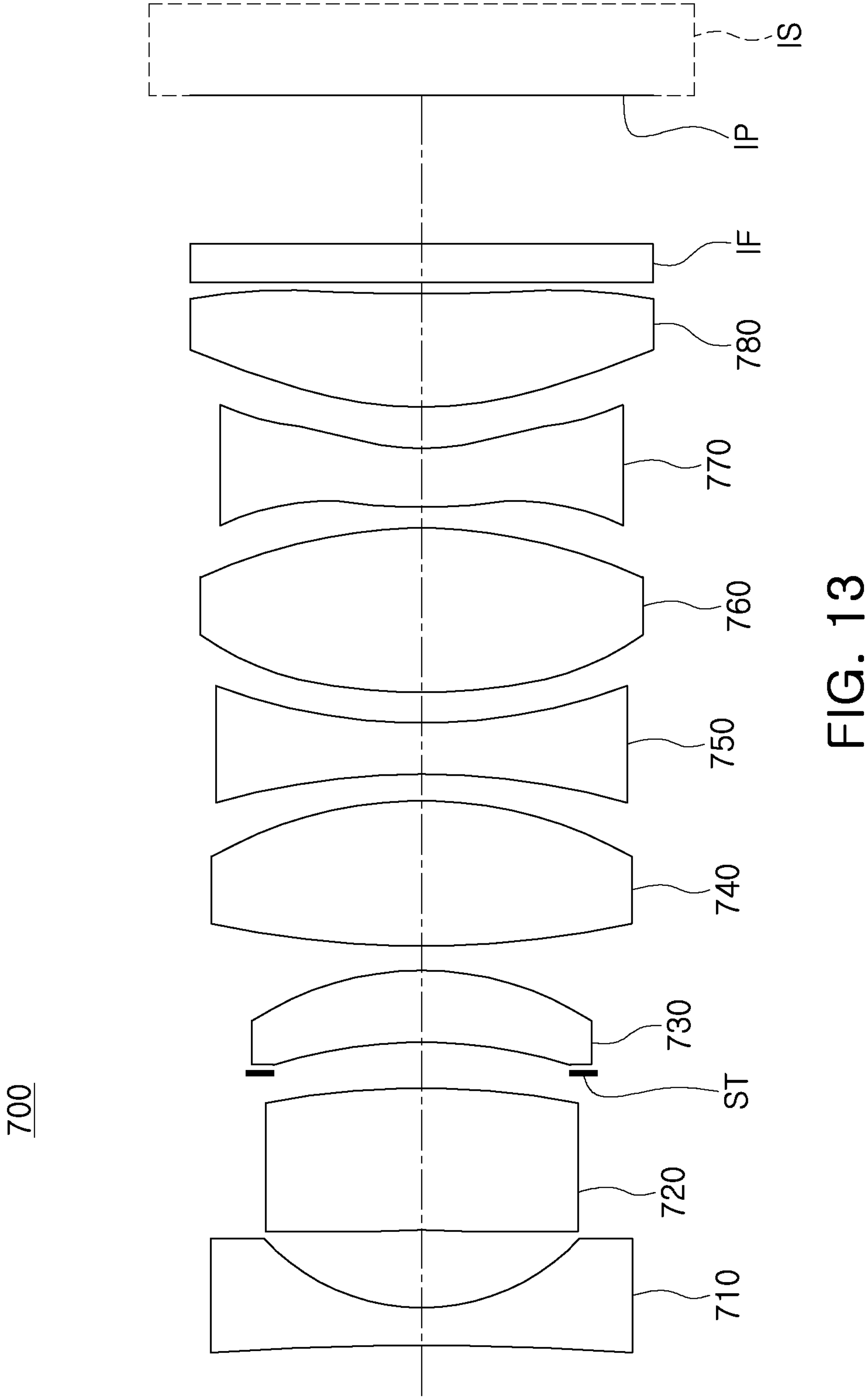
FIG. 13 is a configuration diagram of an imaging lens system according to a seventh example embodiment.

An imaging lens system according to a seventh example embodiment will be described with reference to FIG. 13.

An imaging lens system 700 includes a first lens 710, a second lens 720, a third lens 730, a fourth lens 740, a fifth lens 750, a sixth lens 760, a seventh lens 770, and an eighth lens 780.

The first lens 710 has negative refractive power and has a concave object-side surface and a concave image-side surface. The second lens 720 has positive refractive power and has a convex object-side surface and a convex image-side surface. The third lens 730 has positive refractive power and has a concave object-side surface and a convex image-side surface. The fourth lens 740 has positive refractive power and has a convex object-side surface and a convex image-side surface. The fifth lens 750 has negative refractive power and has a concave object-side surface and a concave image-side surface. The sixth lens 760 has positive refractive power and has a convex object-side surface and a convex image-side surface. The seventh lens 770 has negative refractive power and has a convex object-side surface and a concave image-side surface. In addition, the object-side surface of the seventh lens 770 has an inflection point. The eighth lens 780 has positive refractive power and has a convex object-side surface and a concave image-side surface. A stop ST is disposed between the second lens 720 and the third lens 730.

The imaging lens system 700 may further include a filter IF and an imaging plane IP. The filter IF may be disposed between the eighth lens 780 and the imaging plane IP. The filter IF may be omitted if necessary. The imaging plane IP may be formed on one surface of the image sensor IS of a camera module or inside the image sensor IS. However, the location of the imaging plane IP is not limited to one surface or the inside of the image sensor IS.

Figure 14:
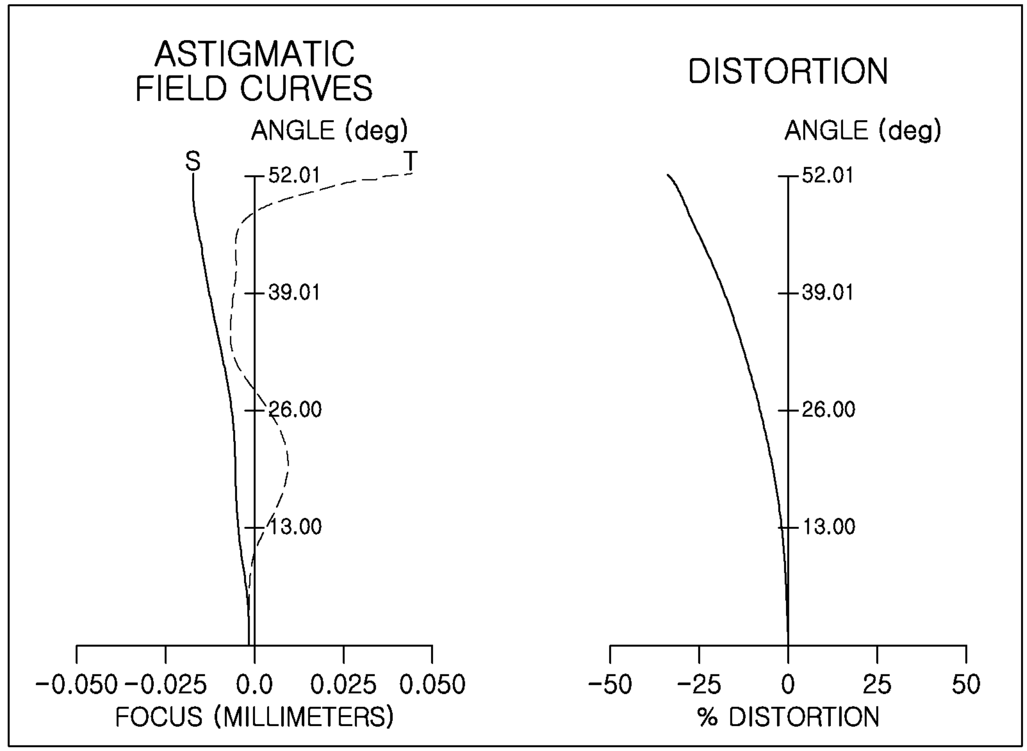
FIG. 14 displays aberration curves of the imaging lens system illustrated in FIG. 13.

Table 13 and Table 14 illustrate lens characteristics and aspherical surface values of the imaging lens system according to the present example embodiment, and FIG. 14 displays aberration curves of the imaging lens system according to the present example embodiment.

TABLE 13

| Surface No. | Component | Radius of Curvature | Thickness/ Distance | Refractive Index | Abbe Number | Effective Radius |
|---|---|---|---|---|---|---|
| S1 | First Lens | −89.4890 | 0.900 | 1.775 | 49.6 | 4.908 |
| S2 | | 4.9610 | 1.810 | | | 3.692 |
| S3 | Second Lens | 258.123 | 3.516 | 1.619 | 25.6 | 3.683 |
| S4 | | −12.2310 | 0.302 | | | 3.558 |
| S5 | Stop | Infinity | 0.793 | | | 3.448 |
| S6 | Third Lens | −7.5470 | 1.662 | 1.538 | 56.0 | 3.541 |
| S7 | | −6.4000 | 0.602 | | | 3.988 |
| S8 | Fourth Lens | 16.6730 | 3.458 | 1.742 | 49.1 | 4.772 |
| S9 | | −9.5000 | 0.688 | | | 4.956 |
| S10 | Fifth Lens | −16.5230 | 1.200 | 1.662 | 21.2 | 4.734 |
| S11 | | 11.4270 | 0.718 | | | 4.843 |
| S12 | Sixth Lens | 13.8330 | 3.963 | 1.538 | 56.0 | 5.203 |
| S13 | | −14.2430 | 0.515 | | | 5.117 |
| S14 | Seventh Lens | 8.9720 | 1.401 | 1.619 | 25.6 | 4.741 |
| S15 | | 4.7890 | 1.005 | | | 4.773 |
| S16 | Eighth Lens | 7.4020 | 2.690 | 1.538 | 56.0 | 5.322 |
| S17 | | 44.9480 | 0.278 | | | 5.427 |
| S18 | Filter | Infinity | 0.900 | 1.518 | 64.2 | 5.412 |
| S19 | | Infinity | 3.601 | | | 5.387 |
| S20 | Imaging Plane | Infinity | 0.002 | | | 5.254 |

TABLE 14

| Surface No. | S3 | S4 | S6 | S7 | S8 | S9 | S10 |
|---|---|---|---|---|---|---|---|
| K | 0.00000 | −9.54856 | 0.00000 | −1.02709 | −3.00541 | 0.00000 | −37.76290 |
| A | 0.00606 | 0.07364 | 0.31069 | 0.09492 | −0.11605 | 0.05553 | −0.23670 |
| B | 0.00348 | −0.00088 | −0.02222 | −0.02639 | 0.00564 | −0.00263 | −0.01019 |
| C | −0.00039 | −0.00105 | 0.00032 | 0.00084 | −0.00012 | 0.00206 | 0.00573 |
| D | 0 | 0 | 0 | 0 | 0 | 0 | 0 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

| Surface No. | S11 | S12 | S13 | S14 | S15 | S16 | S17 |
|---|---|---|---|---|---|---|---|
| K | 0.00000 | 0.00000 | 0.00000 | 0.00000 | −4.43281 | 0.00000 | 0.00000 |
| A | −0.15669 | 0.40469 | −0.27029 | −2.01561 | −0.66858 | −0.94657 | −0.38137 |
| B | −0.00830 | 0.01526 | 0.07900 | 0.19759 | 0.21473 | 0.11668 | −0.01198 |
| C | −0.00368 | −0.00879 | −0.00158 | −0.01031 | −0.01857 | −0.04097 | −0.01837 |
| D | 0 | 0.00149 | 0 | 0 | 0 | 0 | −0.00251 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

Figure 15:
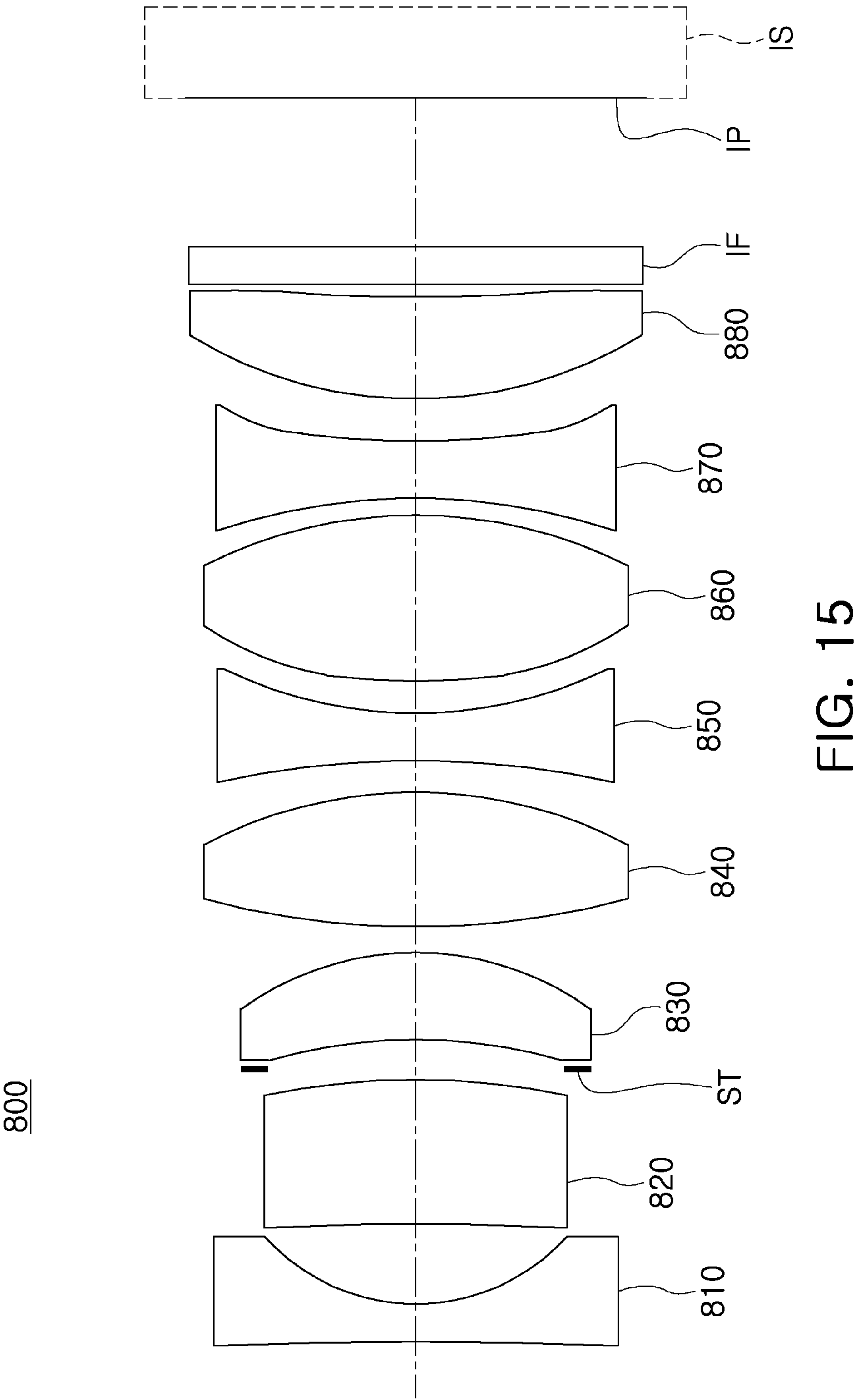
FIG. 15 is a configuration diagram of an imaging lens system according to an eighth example embodiment.

An imaging lens system according to an eighth example embodiment will be described with reference to FIG. 15.

An imaging lens system 800 includes a first lens 810, a second lens 820, a third lens 830, a fourth lens 840, a fifth lens 850, a sixth lens 860, a seventh lens 870, and an eighth lens 880.

The first lens 810 has negative refractive power and has a concave object-side surface and a concave image-side surface. The second lens 820 has positive refractive power and has a concave object-side surface and a convex image-side surface. The third lens 830 has positive refractive power and has a concave object-side surface and a convex image-side surface. The fourth lens 840 has positive refractive power and has a convex object-side surface and a convex image-side surface. The fifth lens 850 has negative refractive power and has a concave object-side surface and a concave image-side surface. The sixth lens 860 has positive refractive power and has a convex object-side surface and a convex image-side surface. The seventh lens 870 has negative refractive power and has a concave object-side surface and a concave image-side surface. The eighth lens 880 has positive refractive power and has a convex object-side surface and a concave image-side surface. A stop ST is disposed between the second lens 820 and the third lens 830.

The imaging lens system 800 may further include a filter IF and an imaging plane IP. The filter IF may be disposed between the eighth lens 880 and the imaging plane IP. The filter IF may be omitted if necessary. The imaging plane IP may be formed on one surface of the image sensor IS of a camera module or inside the image sensor IS. However, the location of the imaging plane IP is not limited to one surface or the inside of the image sensor IS.

Figure 16:
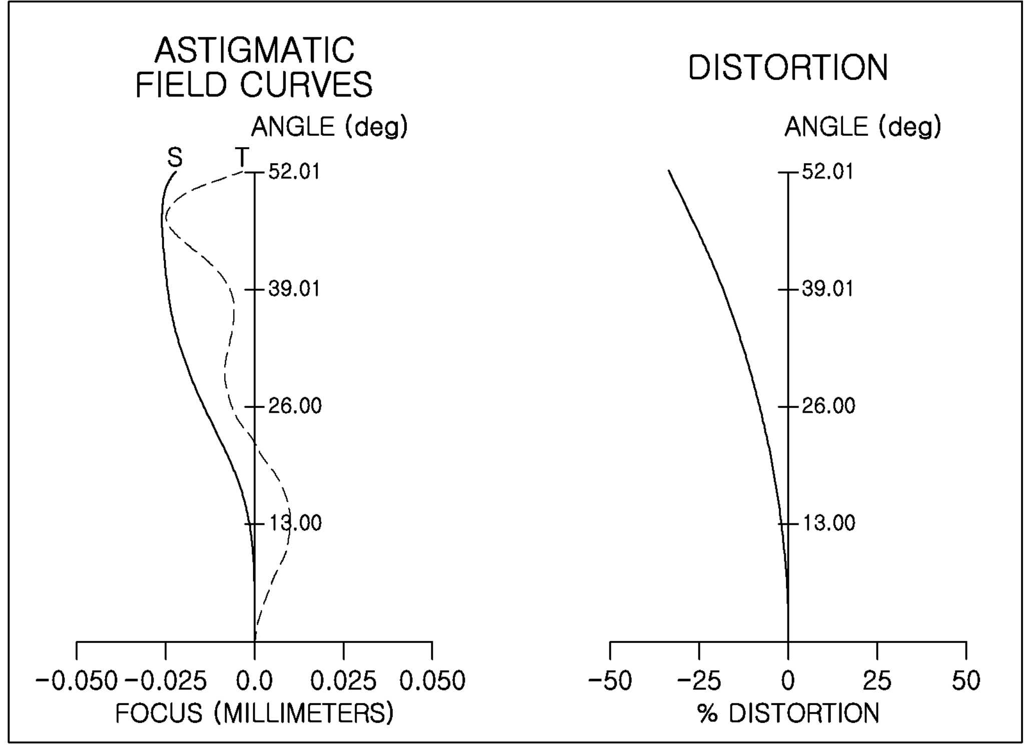
FIG. 16 displays aberration curves of the imaging lens system illustrated in FIG. 15.

Table 15 and Table 16 illustrate lens characteristics and aspherical surface values of the imaging lens system according to the present example embodiment, and FIG. 16 displays aberration curves of the imaging lens system according to the present example embodiment.

TABLE 15

| Surface No. | Component | Radius of Curvature | Thickness/ Distance | Refractive Index | Abbe Number | Effective Radius |
|---|---|---|---|---|---|---|
| S1 | First Lens | −85.0000 | 0.900 | 1.775 | 49.6 | 4.845 |
| S2 | | 4.9180 | 1.881 | | | 3.646 |
| S3 | Second Lens | −612.552 | 3.500 | 1.619 | 25.6 | 3.636 |
| S4 | | −12.0310 | 0.300 | | | 3.623 |
| S5 | Stop | Infinity | 0.723 | | | 3.588 |
| S6 | Third Lens | −7.8340 | 2.078 | 1.538 | 56.0 | 3.697 |
| S7 | | −6.1610 | 0.600 | | | 4.199 |
| S8 | Fourth Lens | 16.0070 | 3.290 | 1.742 | 49.1 | 4.971 |
| S9 | | −9.8170 | 0.688 | | | 5.089 |
| S10 | Fifth Lens | −22.6320 | 1.200 | 1.662 | 21.2 | 4.764 |
| S11 | | 10.6370 | 0.744 | | | 4.660 |
| S12 | Sixth Lens | 15.0510 | 4.000 | 1.538 | 56.0 | 5.087 |
| S13 | | −9.3430 | 0.400 | | | 5.094 |
| S14 | Seventh Lens | −15.4730 | 1.400 | 1.619 | 25.6 | 4.830 |
| S15 | | 19.4640 | 1.001 | | | 4.667 |
| S16 | Eighth Lens | 8.7890 | 2.497 | 1.538 | 56.0 | 5.370 |
| S17 | | 37.1760 | 0.278 | | | 5.416 |
| S18 | Filter | Infinity | 0.900 | 1.518 | 64.2 | 5.407 |
| S19 | | Infinity | 3.622 | | | 5.377 |
| S20 | Imaging Plane | Infinity | 0.000 | | | 5.252 |

TABLE 16

| Surface No. | S3 | S4 | S6 | S7 | S8 | S9 | S10 |
|---|---|---|---|---|---|---|---|
| K | 0.00000 | −7.16050 | 0.00000 | −0.78280 | −1.61312 | 0.00000 | −62.7115 |
| A | −0.05249 | 0.13560 | 0.41265 | 0.13107 | −0.11399 | 0.09732 | −0.18955 |
| B | 0.00143 | 0.00635 | −0.00866 | −0.01176 | 0.01129 | 0.00947 | 0.02987 |
| C | −0.00094 | −0.00159 | −0.00033 | −0.00040 | −0.00457 | −0.00488 | −0.00737 |
| D | 0 | 0 | 0 | 0 | 0 | 0 | 0 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

| Surface No. | S11 | S12 | S13 | S14 | S15 | S16 | S17 |
|---|---|---|---|---|---|---|---|
| K | 0.00000 | 0.00000 | 0.00000 | 0 | −3.22191 | 0.00000 | 0.00000 |
| A | −0.02428 | 0.50574 | 0.38086 | 0 | 0.22871 | −0.33561 | −0.27734 |
| B | 0.05138 | −0.00400 | −0.08116 | 0 | 0.10687 | 0.06252 | −0.00830 |
| C | −0.01234 | −0.01918 | 0.01159 | 0 | −0.01815 | −0.02992 | −0.01467 |
| D | 0 | 0.00320 | 0 | 0 | 0 | 0 | −0.00506 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

Figure 17:
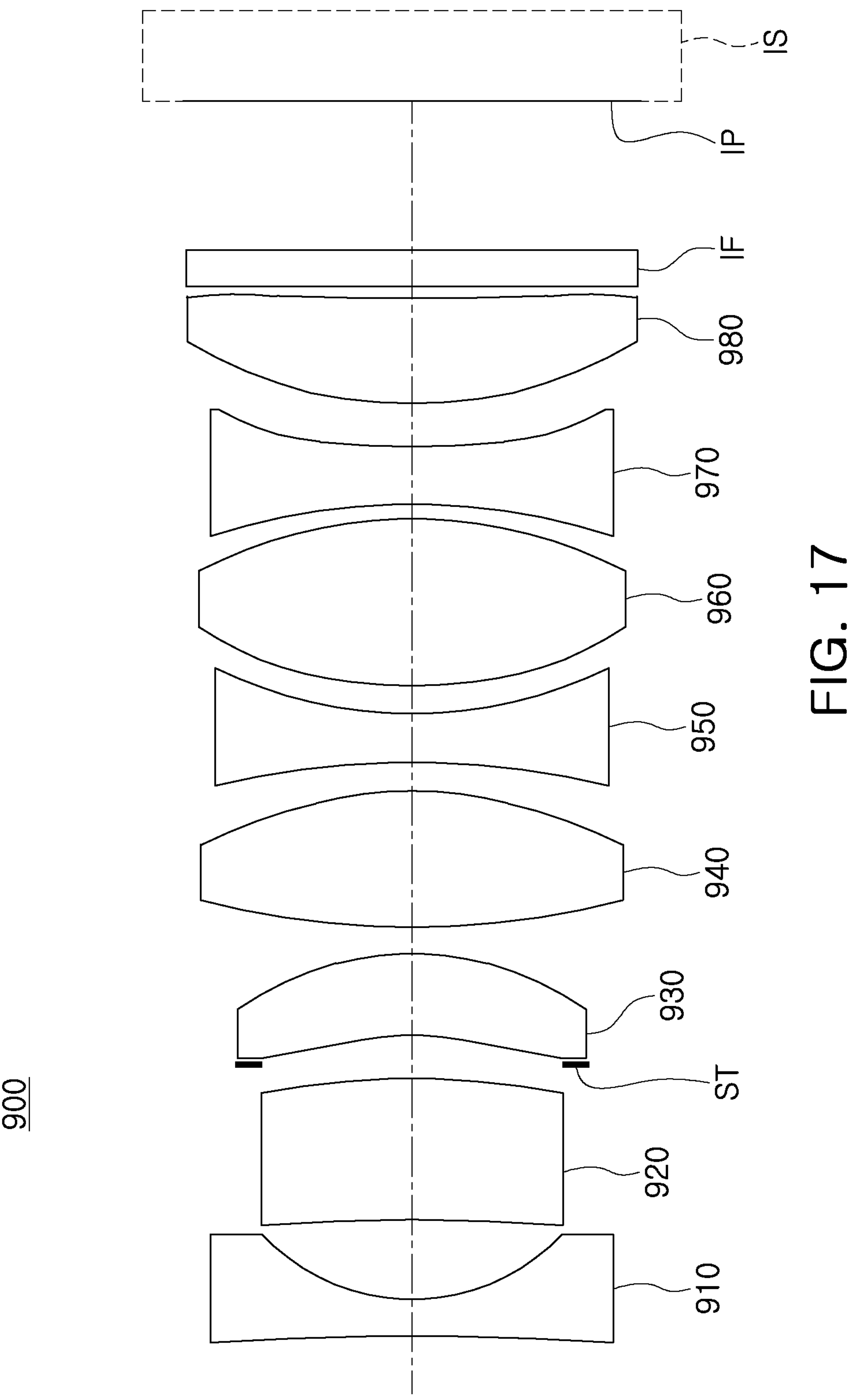
FIG. 17 is a configuration diagram of an imaging lens system according to a ninth example embodiment.

An imaging lens system according to a ninth example embodiment will be described with reference to FIG. 17.

An imaging lens system 900 includes a first lens 910, a second lens 920, a third lens 930, a fourth lens 940, a fifth lens 950, a sixth lens 960, a seventh lens 970, and an eighth lens 980.

The first lens 910 has negative refractive power and has a concave object-side surface and a concave image-side surface. The second lens 920 has positive refractive power and has a concave object-side surface and a convex image-side surface. The third lens 930 has positive refractive power and has a concave object-side surface and a convex image-side surface. The fourth lens 940 has positive refractive power and has a convex object-side surface and a convex image-side surface. The fifth lens 950 has negative refractive power and has a concave object-side surface and a concave image-side surface. The sixth lens 960 has positive refractive power and has a convex object-side surface and a convex image-side surface. The seventh lens 970 has negative refractive power and has a concave object-side surface and a concave image-side surface. The eighth lens 980 has positive refractive power and has a convex object-side surface and a concave image-side surface. A stop ST is disposed between the second lens 920 and the third lens 930.

The imaging lens system 900 may further include a filter IF and an imaging plane IP. The filter IF may be disposed between the eighth lens 980 and the imaging plane IP. The filter IF may be omitted if necessary. The imaging plane IP may be formed on one surface of the image sensor IS of a camera module or inside the image sensor IS. However, the location of the imaging plane IP is not limited to one surface or the inside of the image sensor IS.

Figure 18:
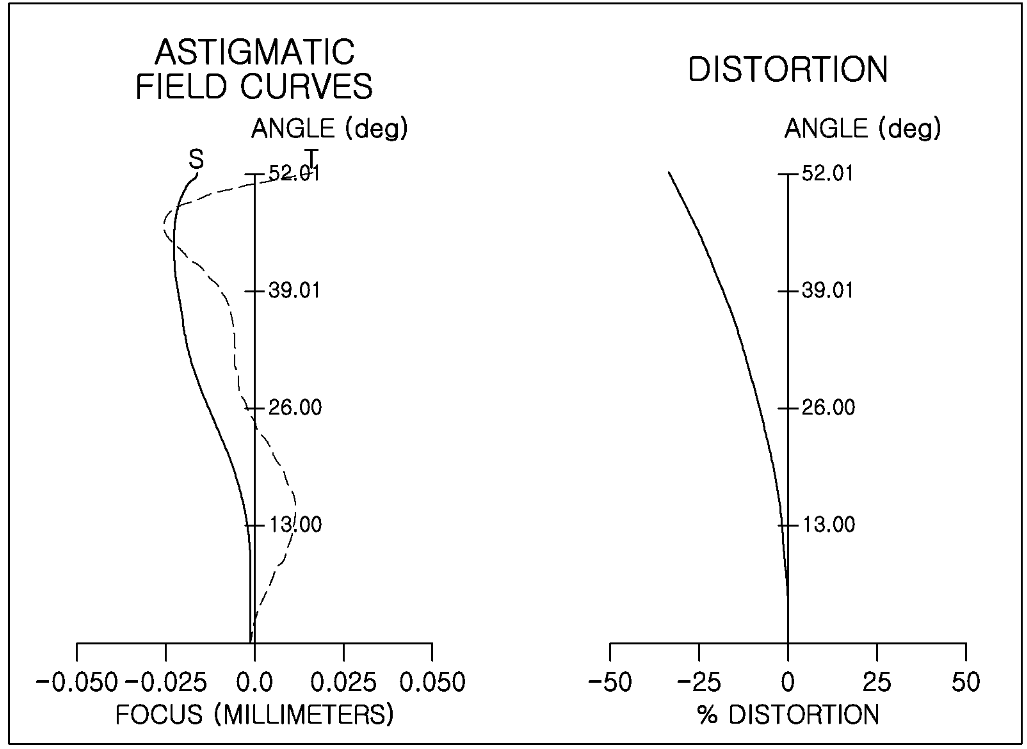
FIG. 18 displays aberration curves of the imaging lens system illustrated in FIG. 17.

Table 17 and Table 18 illustrate lens characteristics and aspherical surface values of the imaging lens system according to the present example embodiment, and FIG. 18 displays aberration curves of the imaging lens system according to the present example embodiment.

TABLE 17

| Surface No. | Component | Radius of Curvature | Thickness/ Distance | Refractive Index | Abbe Number | Effective Radius |
|---|---|---|---|---|---|---|
| S1 | First Lens | −85.0000 | 0.900 | 1.775 | 49.6 | 4.846 |
| S2 | | 4.8880 | 1.893 | | | 3.641 |
| S3 | Second Lens | −2491.389 | 3.503 | 1.619 | 25.6 | 3.633 |
| S4 | | −12.2410 | 0.300 | | | 3.640 |
| S5 | Stop | Infinity | 0.731 | | | 3.609 |
| S6 | Third Lens | −7.7550 | 2.017 | 1.538 | 56.0 | 3.725 |
| S7 | | −6.1140 | 0.600 | | | 4.201 |
| S8 | Fourth Lens | 15.6550 | 3.310 | 1.742 | 49.1 | 4.988 |
| S9 | | −9.9190 | 0.688 | | | 5.102 |
| S10 | Fifth Lens | −22.4080 | 1.200 | 1.662 | 21.2 | 4.760 |
| S11 | | 10.7690 | 0.718 | | | 4.676 |
| S12 | Sixth Lens | 14.8660 | 4.000 | 1.538 | 56.0 | 5.150 |
| S13 | | −9.3680 | 0.400 | | | 5.143 |
| S14 | Seventh Lens | −15.2310 | 1.400 | 1.619 | 25.6 | 4.870 |
| S15 | | 18.5820 | 0.981 | | | 4.698 |
| S16 | Eighth Lens | 8.7750 | 2.562 | 1.538 | 56.0 | 5.370 |
| S17 | | 43.0000 | 0.278 | | | 5.420 |
| S18 | Filter | Infinity | 0.900 | 1.518 | 64.2 | 5.410 |
| S19 | | Infinity | 3.621 | | | 5.381 |
| S20 | Imaging Plane | Infinity | 0.001 | | | 5.251 |

TABLE 18

| Surface No. | S3 | S4 | S6 | S7 | S8 | S9 | S10 |
|---|---|---|---|---|---|---|---|
| K | 0.00000 | −6.77282 | 0.00000 | −0.79114 | −1.93566 | 0.00000 | −62.70650 |
| A | −0.06213 | 0.12999 | 0.43025 | 0.13495 | −0.12391 | 0.07774 | −0.20583 |
| B | 0.00178 | 0.00724 | −0.00823 | −0.01116 | 0.01481 | 0.01318 | 0.02820 |
| C | −0.00087 | −0.00165 | −0.00043 | −0.00049 | −0.00476 | −0.00518 | −0.00795 |
| D | 0 | 0 | 0 | 0 | 0 | 0 | 0 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |
| **Surface No.** | **S11** | **S12** | **S13** | **S14** | **S15** | **S16** | **S17** |
| K | 0.00000 | 0.00000 | 0.00000 | 0.00000 | −4.44831 | 0.00000 | 0.00000 |
| A | −0.03854 | 0.47780 | 0.36879 | 0.00000 | 0.23374 | −0.33171 | −0.24535 |
| B | 0.05578 | 0.01037 | −0.07474 | 0.00000 | 0.10514 | 0.05824 | −0.01286 |
| C | −0.01523 | −0.02301 | 0.01244 | 0.00000 | −0.01891 | −0.02958 | −0.01393 |
| D | 0 | 0.00386 | 0 | 0 | 0 | 0 | −0.00489 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

Figure 19:
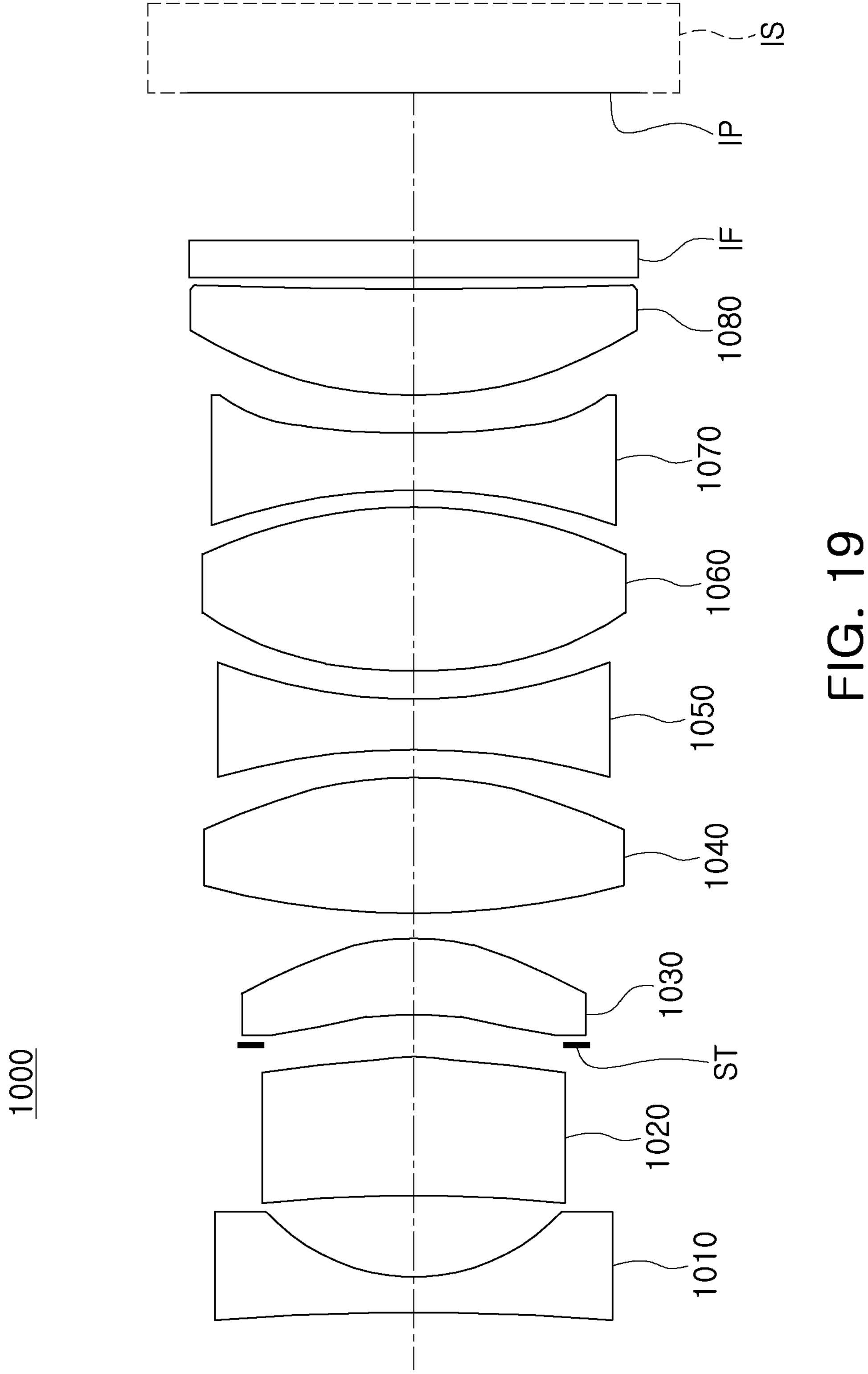
FIG. 19 is a configuration diagram of an imaging lens system according to a tenth example embodiment.

An imaging lens system according to a tenth example embodiment will be described with reference to FIG. 19.

An imaging lens system 1000 includes a first lens 1010, a second lens 1020, a third lens 1030, a fourth lens 1040, a fifth lens 1050, a sixth lens 1060, a seventh lens 1070, and an eighth lens 1080.

The first lens 1010 has negative refractive power and has a concave object-side surface and a concave image-side surface. The second lens 1020 has positive refractive power and has a concave object-side surface and a convex image-side surface. The third lens 1030 has positive refractive power and has a concave object-side surface and a convex image-side surface. The fourth lens 1040 has positive refractive power and has a convex object-side surface and a convex image-side surface. The fifth lens 1050 has negative refractive power and has a concave object-side surface and a concave image-side surface. The sixth lens 1060 has positive refractive power and has a convex object-side surface and a convex image-side surface. The seventh lens 1070 has negative refractive power and has a concave object-side surface and a concave image-side surface. The eighth lens 1080 has positive refractive power and has a convex object-side surface and a concave image-side surface. A stop ST is disposed between the second lens 1020 and the third lens 1030.

The imaging lens system 1000 may further include a filter IF and an imaging plane IP. The filter IF may be disposed between the eighth lens 1080 and the imaging plane IP. The filter IF may be omitted if necessary. The imaging plane IP may be formed on one surface of the image sensor IS of a camera module or inside the image sensor IS. However, the location of the imaging plane IP is not limited to one surface or the inside of the image sensor IS.

Figure 20:
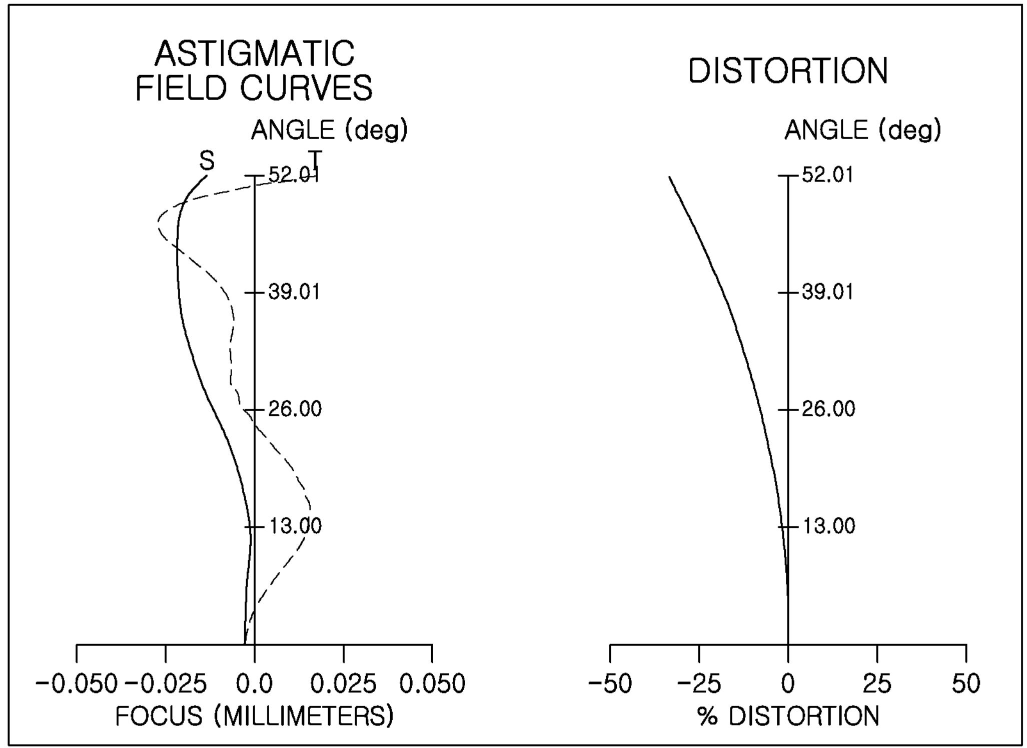
FIG. 20 displays aberration curves of the imaging lens system illustrated in FIG. 19.

Table 19 and Table 20 illustrate lens characteristics and aspherical surface values of the imaging lens system according to the present example embodiment, and FIG. 20 displays aberration curves of the imaging lens system according to the present example embodiment.

TABLE 19

| Surface No. | Component | Radius of Curvature | Thickness/ Distance | Refractive Index | Abbe Number | Effective Radius |
|---|---|---|---|---|---|---|
| S1 | First Lens | −85.0000 | 0.900 | 1.775 | 49.6 | 4.806 |
| S2 | | 4.8910 | 1.933 | | | 3.616 |
| S3 | Second Lens | −214.419 | 3.460 | 1.619 | 25.6 | 3.605 |
| S4 | | −11.7590 | 0.300 | | | 3.674 |
| S5 | Stop | Infinity | 0.749 | | | 3.654 |
| S6 | Third Lens | −7.4560 | 1.850 | 1.538 | 56.0 | 3.774 |
| S7 | | −5.9000 | 0.600 | | | 4.183 |
| S8 | Fourth Lens | 15.6010 | 3.328 | 1.742 | 49.1 | 5.016 |
| S9 | | −9.9670 | 0.688 | | | 5.113 |
| S10 | Fifth Lens | −19.4510 | 1.200 | 1.662 | 21.2 | 4.778 |
| S11 | | 11.6980 | 0.720 | | | 4.740 |
| S12 | Sixth Lens | 14.3750 | 4.000 | 1.538 | 56.0 | 5.171 |
| S13 | | −9.6850 | 0.400 | | | 5.125 |
| S14 | Seventh Lens | −14.9820 | 1.400 | 1.619 | 25.6 | 4.877 |
| S15 | | 17.0540 | 0.916 | | | 4.697 |
| S16 | Eighth Lens | 8.3590 | 2.618 | 1.538 | 56.0 | 5.305 |
| S17 | | 49.0830 | 0.278 | | | 5.338 |
| S18 | Filter | Infinity | 0.900 | 1.518 | 64.2 | 5.326 |
| S19 | | Infinity | 3.621 | | | 5.293 |
| S20 | Imaging Plane | Infinity | 0.003 | | | 5.257 |

TABLE 20

| Surface No. | S3 | S4 | S6 | S7 | S8 | S9 | S10 |
|---|---|---|---|---|---|---|---|
| K | 0.00000 | −5.48857 | 0.00000 | −0.81443 | −1.91589 | 0.00000 | −46.39350 |
| A | −0.10166 | 0.12055 | 0.48244 | 0.14552 | −0.11810 | 0.06840 | −0.28617 |
| B | −0.00011 | 0.01004 | −0.00536 | −0.00901 | 0.01795 | 0.01695 | 0.03593 |
| C | −0.00108 | −0.00183 | −0.00075 | −0.00016 | −0.00485 | −0.00504 | −0.00984 |
| D | 0 | 0 | 0 | 0 | 0 | 0 | 0 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

| Surface No. | S11 | S12 | S13 | S14 | S15 | S16 | S17 |
|---|---|---|---|---|---|---|---|
| K | 0.00000 | 0.00000 | 0.00000 | 0.00000 | −6.16861 | 0.00000 | 0.00000 |
| A | −0.09694 | 0.47855 | 0.39138 | 0.00000 | 0.24485 | −0.41985 | −0.20599 |
| B | 0.06397 | 0.01311 | −0.07935 | 0.00000 | 0.11956 | 0.06729 | −0.01634 |
| C | −0.01835 | −0.02347 | 0.01667 | 0.00000 | −0.02443 | −0.03516 | −0.01624 |
| D | 0 | 0.00458 | 0 | 0 | 0 | 0 | −0.00655 |
| E | 0 | 0 | 0 | 0 | 0 | 0 | 0 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| J | 0 | 0 | 0 | 0 | 0 | 0 | 0 |

Table 21, Table 22, Table 23, and Table 24 are optical characteristic values and conditional expression values of the imaging lens systems according to the first to tenth example embodiments. For reference, in Table 21 and Table 22, VFOV is a vertical field of view, HFOV is a horizontal field of view, and DFOV is a diagonal field of view.

TABLE 21

| Note | First Example embodi-ment | Second Example embodi-ment | Third Example embodi-ment | Fourth Example embodi-ment | Fifth Example embodi-ment |
|---|---|---|---|---|---|
| f | 6.232 | 6.252 | 6.249 | 6.252 | 6.235 |
| f1 | −6.313 | −6.441 | −6.277 | −7.016 | −6.073 |
| f2 | 17.104 | 17.621 | 17.077 | 20.636 | 19.196 |
| f3 | 64.858 | 120.751 | 126.173 | 103.598 | 57.158 |
| f4 | 7.842 | 7.349 | 7.299 | 8.350 | 8.601 |
| f5 | −9.501 | −10.029 | −9.852 | −8.247 | −10.011 |
| f6 | 15.718 | 13.418 | 12.914 | 10.461 | 13.376 |
| f7 | −25.950 | −23.586 | −18.325 | −24.985 | −19.202 |
| f8 | 18.621 | 30.052 | 21.666 | 23.709 | 16.367 |
| D1 | 9.567 | 9.358 | 9.364 | 9.564 | 9.808 |
| TTL | 28.923 | 29.127 | 28.380 | 29.231 | 29.978 |
| f number | 1.620 | 1.620 | 1.620 | 1.627 | 1.620 |
| VFOV | 52.070 | 52.070 | 52.070 | 52.070 | 52.070 |
| HFOV | 82.500 | 82.500 | 82.500 | 82.500 | 82.500 |
| DFOV | 101.500 | 101.500 | 101.500 | 101.500 | 101.500 |
| ImgHT | 5.145 | 5.145 | 5.145 | 5.145 | 5.145 |

TABLE 22

| Note | Sixth Example embodi-ment | Seventh Example embodi-ment | Eighth Example embodi-ment | Ninth Example embodi-ment | Tenth Example embodi-ment |
|---|---|---|---|---|---|
| f | 6.253 | 6.241 | 6.253 | 6.253 | 6.253 |
| f1 | −6.038 | −6.038 | −5.970 | −5.935 | −5.939 |
| f2 | 19.855 | 18.973 | 19.796 | 19.878 | 19.983 |
| f3 | 52.347 | 51.920 | 37.366 | 37.548 | 37.102 |
| f4 | 8.652 | 8.645 | 8.674 | 8.664 | 8.680 |
| f5 | −10.775 | −10.039 | −10.783 | −10.838 | −10.874 |
| f6 | 13.570 | 13.716 | 11.362 | 11.331 | 11.415 |
| f7 | −15.764 | −19.048 | −13.726 | −13.322 | −12.682 |
| f8 | 15.135 | 16.060 | 20.748 | 19.962 | 18.305 |
| D1 | 9.688 | 9.816 | 9.690 | 9.692 | 9.612 |
| TTL | 29.999 | 30.004 | 30.002 | 30.003 | 29.864 |
| f number | 1.641 | 1.620 | 1.620 | 1.620 | 1.620 |
| VFOV | 51.910 | 51.910 | 51.910 | 51.910 | 51.910 |
| HFOV | 82.500 | 82.500 | 82.500 | 82.500 | 82.500 |
| DFOV | 101.490 | 101.490 | 101.490 | 101.490 | 101.490 |
| ImgHT | 5.145 | 5.145 | 5.145 | 5.145 | 5.145 |

TABLE 23

| Conditional Expression | First Example embodiment | Second Example embodiment | Third Example embodiment | Fourth Example embodiment | Fifth Example embodiment |
|---|---|---|---|---|---|
| f/f4 | 0.7947 | 0.8508 | 0.8562 | 0.7488 | 0.7249 |
| L1D1/TTL | 0.3308 | 0.3213 | 0.3300 | 0.3272 | 0.3272 |
| ImgHT/TTL | 0.1779 | 0.1766 | 0.1813 | 0.1760 | 0.1716 |
| f1/f2 | −0.3691 | −0.3655 | −0.3676 | −0.3400 | −0.3163 |
| f5/f6 | −0.6045 | −0.7474 | −0.7629 | −0.7884 | −0.7484 |
| TTL/f | 4.6408 | 4.6585 | 4.5412 | 4.6751 | 4.8080 |
| L1D1/ImgHT | 1.8594 | 1.8189 | 1.8200 | 1.8589 | 1.9063 |
| f1/f | −1.0178 | −1.0303 | −1.0047 | −1.1225 | −0.9744 |
| f1/f3 | −0.0972 | −0.0534 | −0.0498 | −0.0677 | −0.1062 |
| f1/f4 | −0.8051 | −0.8771 | −0.8607 | −0.8409 | −0.7066 |
| V1 − V3 | −6.3560 | −6.3560 | −6.3560 | −6.3560 | −6.3560 |

TABLE 23-continued

| Conditional Expression | First Example embodiment | Second Example embodiment | Third Example embodiment | Fourth Example embodiment | Fifth Example embodiment |
|---|---|---|---|---|---|
| \|f/R1\| | 0.0208 | 0.0099 | 0.0245 | 0.0486 | 0.0674 |
| \|R2/R1\| | 0.0160 | 0.0080 | 0.0195 | 0.0404 | 0.0538 |
| \|R5/R6\| | 1.0403 | 0.9812 | 0.9759 | 1.0051 | 1.1574 |
| V4/(Nd1 + Nd4) | 13.9704 | 13.9406 | 13.9406 | 13.9485 | 13.9485 |
| V3/(Nd1 + Nd4) | 15.9419 | 15.9079 | 15.9079 | 15.9170 | 15.9170 |
| (Nd1 + Nd4)/Ndmin | 2.3117 | 2.3167 | 2.3167 | 2.3169 | 2.3169 |
| V1/Nd2 + V4/Nd5 | 60.364 | 60.131 | 60.131 | 60.168 | 60.168 |

TABLE 24

| Conditional Expression | Sixth Example embodiment | Seventh Example embodiment | Eighth Example embodiment | Ninth Example embodiment | Tenth Example embodiment |
|---|---|---|---|---|---|
| f/f4 | 0.7227 | 0.7219 | 0.7209 | 0.7218 | 0.7204 |
| L1D1/TTL | 0.3229 | 0.3272 | 0.3230 | 0.3230 | 0.3219 |
| ImgHT/TTL | 0.1715 | 0.1715 | 0.1715 | 0.1715 | 0.1723 |
| f1/f2 | −0.3041 | −0.3182 | −0.3016 | −0.2986 | −0.2972 |
| f5/f6 | −0.7940 | −0.7320 | −0.9490 | −0.9565 | −0.9527 |
| TTL/f | 4.7976 | 4.8075 | 4.7978 | 4.7980 | 4.7757 |
| L1D1/ImgHT | 1.8830 | 1.9079 | 1.8834 | 1.8838 | 1.8682 |
| f1/f | −0.9659 | −0.9678 | −0.9551 | −0.9496 | −0.9502 |
| f1/f3 | −0.1153 | −0.1163 | −0.1598 | −0.1581 | −0.1601 |
| f1/f4 | −0.6984 | −0.6989 | −0.6888 | −0.6857 | −0.6847 |
| V1 − V3 | −6.3560 | −6.3560 | −6.3560 | −6.3560 | −6.3560 |
| \|f/R1\| | 0.0699 | 0.0697 | 0.0736 | 0.0736 | 0.0736 |
| \|R2/R1\| | 0.0554 | 0.0554 | 0.0579 | 0.0575 | 0.0575 |
| \|R5/R6\| | 1.1744 | 1.1792 | 1.2715 | 1.2684 | 1.2637 |
| V4/(Nd1 + Nd4) | 13.9485 | 13.9485 | 13.9485 | 13.9485 | 13.9485 |
| V3/(Nd1 + Nd4) | 15.9170 | 15.9170 | 15.9170 | 15.9170 | 15.9170 |
| (Nd1 + Nd4)/Ndmin | 2.3169 | 2.3169 | 2.3169 | 2.3169 | 2.3169 |
| V1/Nd2 + V4/Nd5 | 60.168 | 60.168 | 60.168 | 60.168 | 60.168 |

According to one or more example embodiments as disclosed herein, an imaging lens system may include a first lens, a second lens, a third lens, a fourth lens, a fifth lens, a sixth lens, a seventh lens, and an eighth lens sequentially disposed from an object side. The imaging lens system according to one or more example embodiments as disclosed herein may include a lens formed of glass capable of exhibiting constant performance even in a wide range of temperature conditions.

The present disclosure may implement an imaging lens system capable of minimizing deterioration caused by ultraviolet rays, while having a wide operating temperature range.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:

a first lens having negative refractive power;

a second lens having positive refractive power;

a third lens having positive refractive power;

a fourth lens having positive refractive power;

a fifth lens having negative refractive power and a concave object-side surface;

a sixth lens having positive refractive power and a convex object-side surface;

a seventh lens having negative refractive power; and an eighth lens having positive refractive power, wherein the first to eighth lenses are sequentially disposed at intervals from the object-side surface, wherein the imaging lens system has a total number of eight lenses with refractive power, wherein the imaging lens system satisfies the following conditional expression:

$$0.170<ImgHT/TTL<0.182$$

where ImgHT is a height of an imaging plane and TTL is a distance from an object-side surface of the first lens to the imaging plane.

2. The imaging lens system of claim 1, wherein the imaging lens system satisfies the following conditional expression:

$$0.70<f/f4<0.90$$

where f is a focal length of the imaging lens system and f4 is a focal length of the fourth lens.

3. The imaging lens system of claim 1, wherein the imaging lens system satisfies the following conditional expression:

$$L1D1/TTL<0.350$$

where L1D1 is an effective diameter of an object-side surface of the first lens.

4. The imaging lens system of claim 1, wherein the imaging lens system satisfies the following conditional expression:

$$f1/f2<0$$

where f1 is a focal length of the first lens and f2 is a focal length of the second lens.

5. The imaging lens system of claim 1, wherein the imaging lens system satisfies the following conditional expression:

$$f5/f6<0$$

where f5 is a focal length of the fifth lens and f6 is a focal length of the sixth lens.

6. The imaging lens system of claim 1, wherein the imaging lens system satisfies the following conditional expression:

$$4.50<TTL/f<4.90$$

where f is a focal length of the imaging lens system.

7. The imaging lens system of claim 1, wherein the imaging lens system satisfies the following conditional expression:

$$L1D1/ImgHT<2.0$$

where L1D1 is an effective diameter of an object-side surface of the first lens.

8. The imaging lens system of claim 1, wherein f number is less than 1.7.

9. An imaging lens system comprising:

a first lens, a second lens, a third lens, a fourth lens, a fifth lens, a sixth lens, a seventh lens, and an eighth lens sequentially disposed at intervals from an object side, wherein the first lens and the fifth lens each have negative refractive power, wherein the second to fourth lenses each have positive refractive power, wherein the sixth lens has positive refractive power and a convex object-side surface, wherein the seventh lens has negative refractive power, wherein the eighth lens has positive refractive power, wherein the imaging lens system has a total number of eight lenses with refractive power, and wherein the imaging lens system satisfies the following conditional expression:

$$15.0<V3/(Nd1+Nd4)<17.0$$

where Nd1 is a refractive index of the first lens, Nd4 is a refractive index of the fourth lens, and V3 is an Abbe number of the third lens.

10. The imaging lens system of claim 9, wherein the imaging lens system satisfies the following conditional expression:

$$1.60<L1D1/ImgHT<2.0$$

where L1D1 is an effective diameter of an object-side surface of the first lens and ImgHT is a height of an imaging plane.

11. The imaging lens system of claim 9, wherein the imaging lens system satisfies the following conditional expression:

$$0.009<|f/R1|<0.090$$

where f is a focal length of the imaging lens system and R1 is a radius of curvature of an object-side surface of the first lens.

12. The imaging lens system of claim 9, wherein the imaging lens system satisfies the following conditional expression:

$$0.002<|R2/R1|<0.080$$

where R1 is a radius of curvature of an object-side surface of the first lens and R2 is a radius of curvature of an image-side surface of the first lens.

13. The imaging lens system of claim 9, wherein the imaging lens system satisfies the following conditional expression:

$$0.80<|R5/R6|<1.40$$

where R5 is a radius of curvature of an object-side surface of the third lens and R6 is a radius of curvature of an image-side surface of the third lens.

14. The imaging lens system of claim 9, wherein the imaging lens system satisfies the following conditional expression:

$$12<V4/(Nd1+Nd4)<15$$

where V4 is an Abbe number of the fourth lens.

15. The imaging lens system of claim 9, wherein the imaging lens system satisfies the following conditional expression:

$$2.3<(Nd1+Nd4)/Nd\text{min}$$

where Ndmin is a minimum value among refractive indices of the first to eighth lenses.

16. The imaging lens system of claim 9, wherein the imaging lens system satisfies the following conditional expression:

$$59<V1/Nd2+V4/Nd5<62$$

where V1 is an Abbe number of the first lens, V4 is an Abbe number of the fourth lens, Nd2 is a refractive index of the second lens, and Nd5 is a refractive index of the fifth lens.

17. An imaging lens system comprising:

a first lens having negative refractive power and an index of refraction greater than 1.74 and less than 1.90;

a second lens having positive refractive power;

a third lens having positive refractive power;

a fourth lens having positive refractive power and an index of refraction greater than 1.70 and less than 1.84;

a fifth lens having negative refractive power;

a sixth lens having a positive refractive power;

a seventh lens having negative refractive power; and an eighth lens having positive refractive power, wherein the first to eighth lenses are sequentially disposed at intervals from the object-side surface, wherein the imaging lens system has a total number of eight lenses with refractive power.

18. The imaging lens system of claim 17, wherein the first lens has a concave image-side surface, and the second lens has a convex image-side surface.

19. The imaging lens system of claim 17, wherein the third lens has a concave object-side surface, the fourth lens has a convex object-side surface, the fifth lens has a concave object-side surface, and the sixth lens has a convex object-side surface.

20. The imaging lens system of claim 17, wherein the seventh lens has a concave image-side surface, and the eighth lens has a convex object-side surface.

* * * * *